(12) United States Patent
Klimov et al.

(10) Patent No.: US 10,955,617 B2
(45) Date of Patent: Mar. 23, 2021

(54) HIGH-RESOLUTION PHOTONIC THERMOMETER ARTICLE

(71) Applicant: Government of the United States of America, as represented by the Secretary of Commerce, Gaithersburg, MD (US)

(72) Inventors: Nikolai Nikolaevich Klimov, Ellicott City, MD (US); Kevin O'Connell Douglass, Ellicott City, MD (US); Zeeshan Ahmed, Washington, DC (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 0 days.

(21) Appl. No.: 16/589,793

(22) Filed: Oct. 1, 2019

(65) Prior Publication Data
US 2020/0103594 A1 Apr. 2, 2020

Related U.S. Application Data

(60) Provisional application No. 62/739,569, filed on Oct. 1, 2018.

(51) Int. Cl.
*G02B 6/30* (2006.01)
*G02B 1/00* (2006.01)
*G02B 6/12* (2006.01)

(52) U.S. Cl.
CPC ............ *G02B 6/30* (2013.01); *G02B 1/005* (2013.01); *G02B 6/12* (2013.01); *G02B 2006/12135* (2013.01); *G02B 2006/12142* (2013.01)

(58) Field of Classification Search
None
See application file for complete search history.

(56) References Cited

U.S. PATENT DOCUMENTS 8,508,370 B1 * 8/2013 El-Kady ............... G08B 13/14
340/572.1
8,798,414 B2 8/2014 Quan et al.
(Continued)

OTHER PUBLICATIONS

Quan, et al., "Deterministic design of wavelength scale, ultra-high Q photonic crystal nanobeam cavities", Optics Express, 2011, p. 18529-18542, vol. 19 No. 19.

*Primary Examiner* — Tina M Wong
(74) *Attorney, Agent, or Firm* — Office of Chief Counsel for National Institute of Standards and Technology

(57) ABSTRACT

A high-resolution photonic thermometer article performs high-resolution thermometry and includes: a light source; a photonic thermometer with a waveguide and a photonic crystal cavity that stores light; a photodetector in communication with the photonic thermometer; a phase sensitive detector in communication with the photodetector and that: receives the photodetector signal from the photodetector; receives a reference frequency signal; and produces a lock signal from the photodetector signal, based on the reference frequency signal; a local oscillator in communication with the phase sensitive detector and that produces the reference frequency signal; and a servo controller in communication with the phase sensitive detector and local oscillator and that: receives the lock signal from the phase sensitive detector; receives the reference frequency signal from the local oscillator; and produces the control signal such that absorption power of the photonic crystal is maximized through wavelength control of the light source by the control signal.

19 Claims, 30 Drawing Sheets

(56) References Cited

U.S. PATENT DOCUMENTS

| | | | |
|---|---|---|---|
| 10,782,421 B2 * | 9/2020 | Tosh | G01T 1/026 |
| 10,795,081 B1 * | 10/2020 | Li | B82Y 20/00 |
| 2009/0059406 A1 * | 3/2009 | Powers | G02B 6/262 |
| | | | 359/889 |
| 2019/0293809 A1 * | 9/2019 | Tosh | G01T 1/026 |
| 2020/0103594 A1 * | 4/2020 | Klimov | G02B 6/12 |

* cited by examiner (A)

(B)

(A)

(B)

(A) 306

(B) 306

(C) 107

(A)

(B)

$$r_{taper}(i) = \left[ R_{MAX}{}^\rho + \left(R_{MIN}{}^\rho - R_{MAX}{}^\rho\right)\left(\frac{i-1}{N}\right)^\sigma \right]^{\frac{1}{\rho}};$$

$$r_{taper}(i=1) = R_{MAX};$$

$$r_{taper}(i=N) = R_{MIN}$$

$$\gamma_{linear}(i) = \frac{\gamma(R_{MIN})}{N} i, \quad i = 1, 2, \ldots, N$$

$$\gamma_i = \gamma_{interpolated}(r_{taper})$$

HIGH-RESOLUTION PHOTONIC THERMOMETER ARTICLE

CROSS REFERENCE TO RELATED APPLICATIONS

The application claims priority to U.S. Provisional Patent Application Ser. No. 62/739,569 filed Oct. 1, 2018, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov; reference U.S. patent application Ser. No. 16/589,793.

BRIEF DESCRIPTION

Disclosed is a high-resolution photonic thermometer article for performing high-resolution thermometry, the high-resolution photonic thermometer article comprising: a light source that: receives a control signal; and produces, based on the control signal, a primary light that comprises a primary wavelength and a primary power; a photonic thermometer in communication with the light source and comprising: a waveguide in communication with a photonic crystal cavity and comprising: an input light coupler that receives the primary light; a photonic crystal cavity in communication with the input light coupler and that: interacts with the primary light from the input light coupler; and stores the primary light when the primary wavelength matches a resonance frequency of the photonic crystal cavity, such that an amount of primary light stored in the photonic crystal cavity comprises an absorption power; and the waveguide further comprising an output light coupler in communication with the photonic crystal cavity and that: receives the primary light as thermometer light after the primary light has interacted with the photonic crystal cavity, the thermometer light comprising a transmission power that is indirectly proportional to the absorption power of the primary light stored in the photonic crystal cavity; a photodetector in communication with the photonic thermometer and that: receives the thermometer light from the photonic thermometer; and produces a photodetector signal from the thermometer light; a phase sensitive detector in communication with the photodetector and that: receives the photodetector signal from the photodetector; receives a reference frequency signal; and produces a lock signal from the photodetector signal, based on the reference frequency signal; a local oscillator in communication with the phase sensitive detector and that produces the reference frequency signal; and a servo controller in communication with the phase sensitive detector and the local oscillator and that: receives the lock signal from the phase sensitive detector; receives the reference frequency signal from the local oscillator; and produces the control signal from the lock signal and the reference frequency signal such that the absorption power is maximized through wavelength control of the light source by the control signal.

Also disclosed is a process for making the high-resolution photonic thermometer article, the process comprising: forming the waveguide on the substrate; determining a photonic band gap between a dielectric band edge function f1 and an air band edge function f2 for the photonic crystal cavity as a function of the size of the radius of the photonic apertures; selecting a resonance frequency $f_{res}$; determining a maximum aperture radius $R_{max}$ such that $f1(R_{max})=f_{res}$; selecting a minimum aperture radius $R_{min}$; selecting a number N of pairs of photonic apertures; determining a photonic mirror strength G as a function of radius ri of photonic apertures for selected resonance frequency fres so that $G_i=\{G(r_i), i=1, 2, \ldots, N\}$; forming the photonic crystal cavity on the substrate; and tapering the radii of the photonic apertures in the photonic crystal cavity from the maximum aperture radius $R_{max}$ to the minimum aperture radius Rmin based on the photonic mirror strength G to make the high-resolution photonic thermometer article.

Disclosed is a process for performing high-resolution photonic thermometry with the high-resolution photonic thermometer article, the process comprising: receiving, by the light source, the control signal; producing, by the light source, the primary light; receiving, by the input light coupler of the photonic thermometer, the primary light; communicating the primary light to the photonic crystal cavity; receiving, by the photonic crystal cavity, the primary light from the waveguide; storing, by the photonic crystal cavity, the primary light when the primary light matches the resonance frequency of the photonic crystal cavity; receiving, by the output light coupler, the primary light as the thermometer light after the primary light has interacted with the photonic crystal cavity; communicating the thermometer light from the photonic thermometer; receiving, by the photodetector, the thermometer light from the photonic thermometer; producing, by the photodetector, the photodetector signal from the thermometer light; receiving, by the phase sensitive detector, the photodetector signal from the photodetector; receiving, by the phase sensitive detector, the reference frequency signal; producing, by the phase sensitive detector, the lock signal from the photodetector signal, based on the reference frequency signal; producing, by the local oscillator, the reference frequency signal; and receiving, by the servo controller, the lock signal from the phase sensitive detector and the reference frequency signal from the local oscillator; producing, by the servo controller, the control signal from the lock signal and the reference frequency signal; and controlling, with the by the control signal, the primary wavelength of the primary light produced by the light source to maximize the absorption power to perform high-resolution photonic thermometry.

BRIEF DESCRIPTION OF THE DRAWINGS

The following description should not be considered limiting in any way. With reference to the accompanying drawings, like elements are numbered alike.

DETAILED DESCRIPTION

Figure 1:
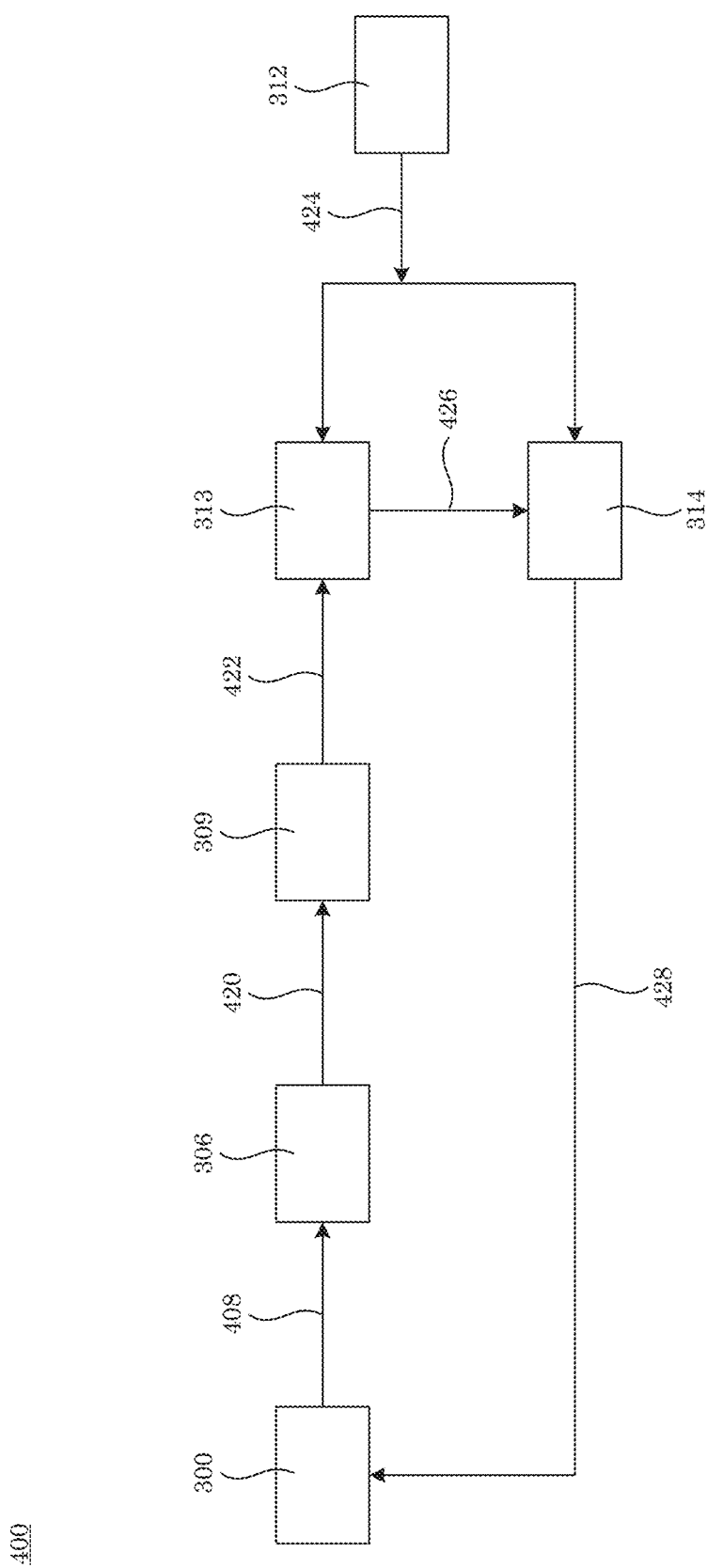
FIG. 1 shows a high-resolution photonic thermometer article.
Figure 2:
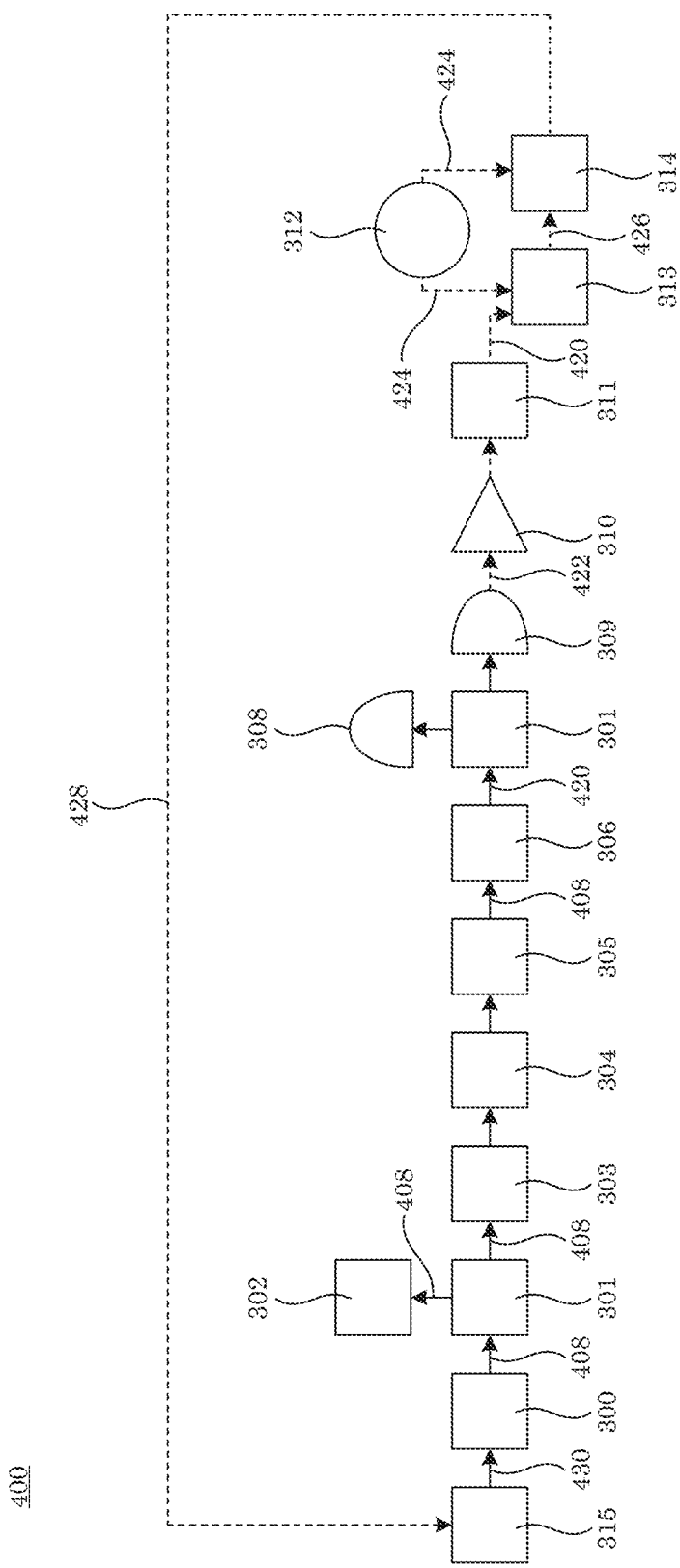
FIG. 2 shows a high-resolution photonic thermometer article.
Figure 3:
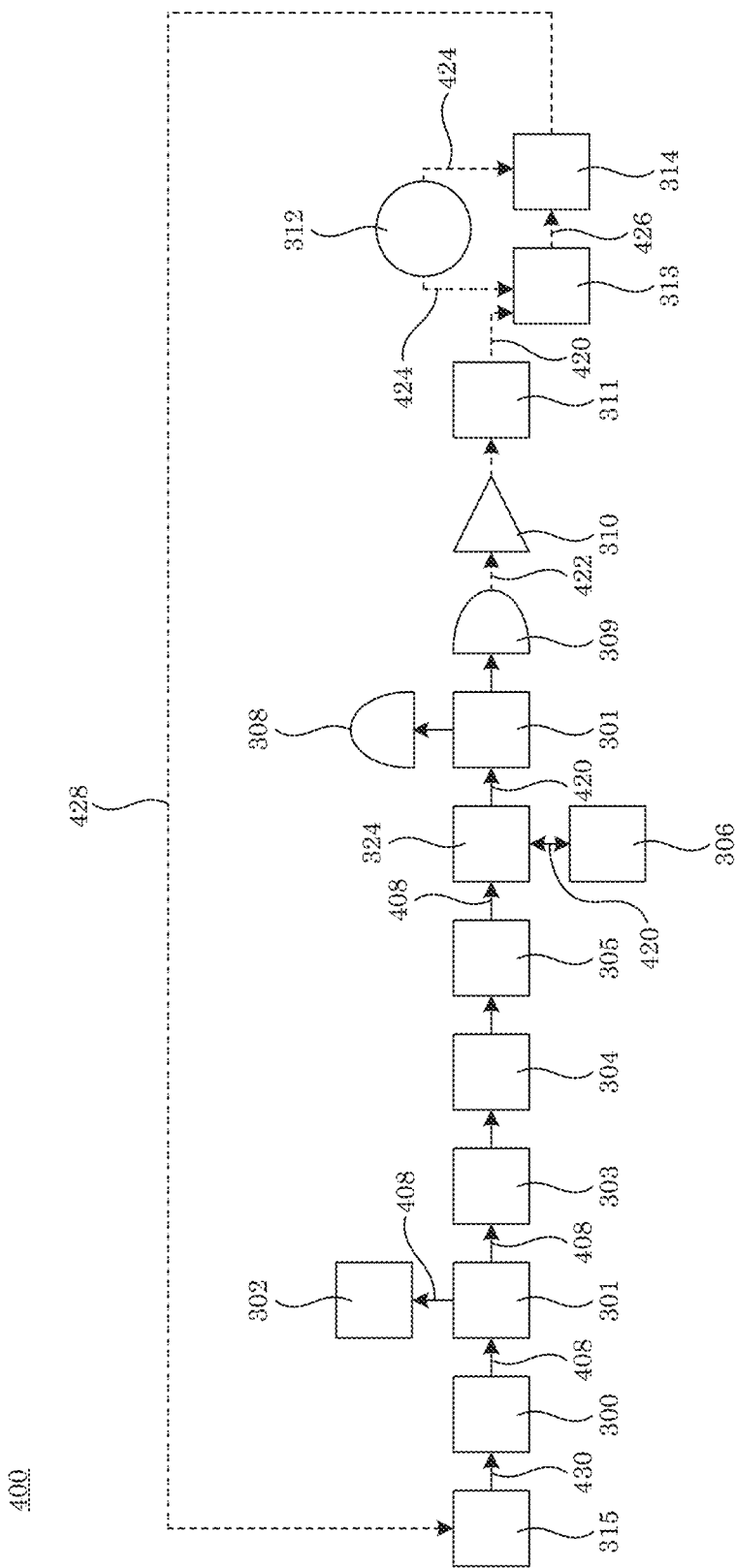
FIG. 3 shows a high-resolution photonic thermometer article.
Figure 4:
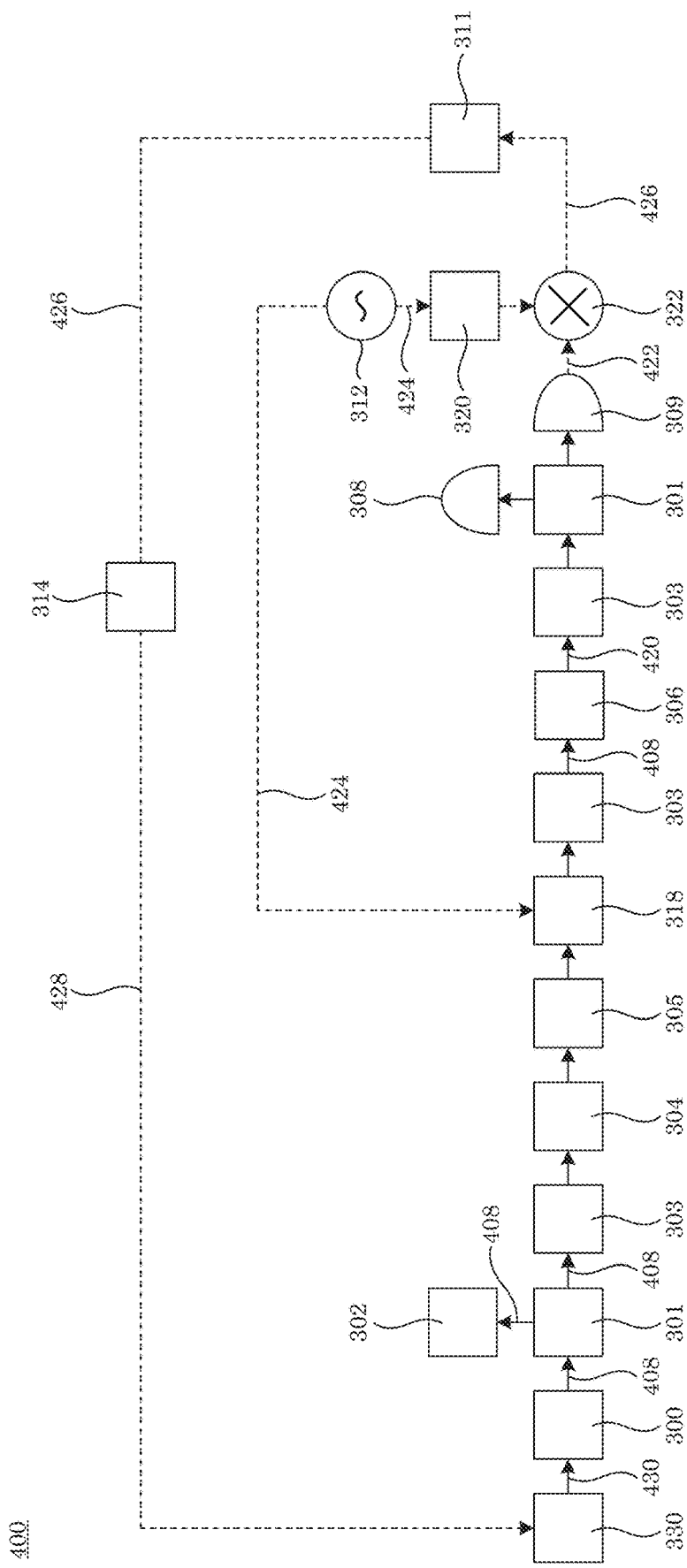
FIG. 4 shows a high-resolution photonic thermometer article.
Figure 5:
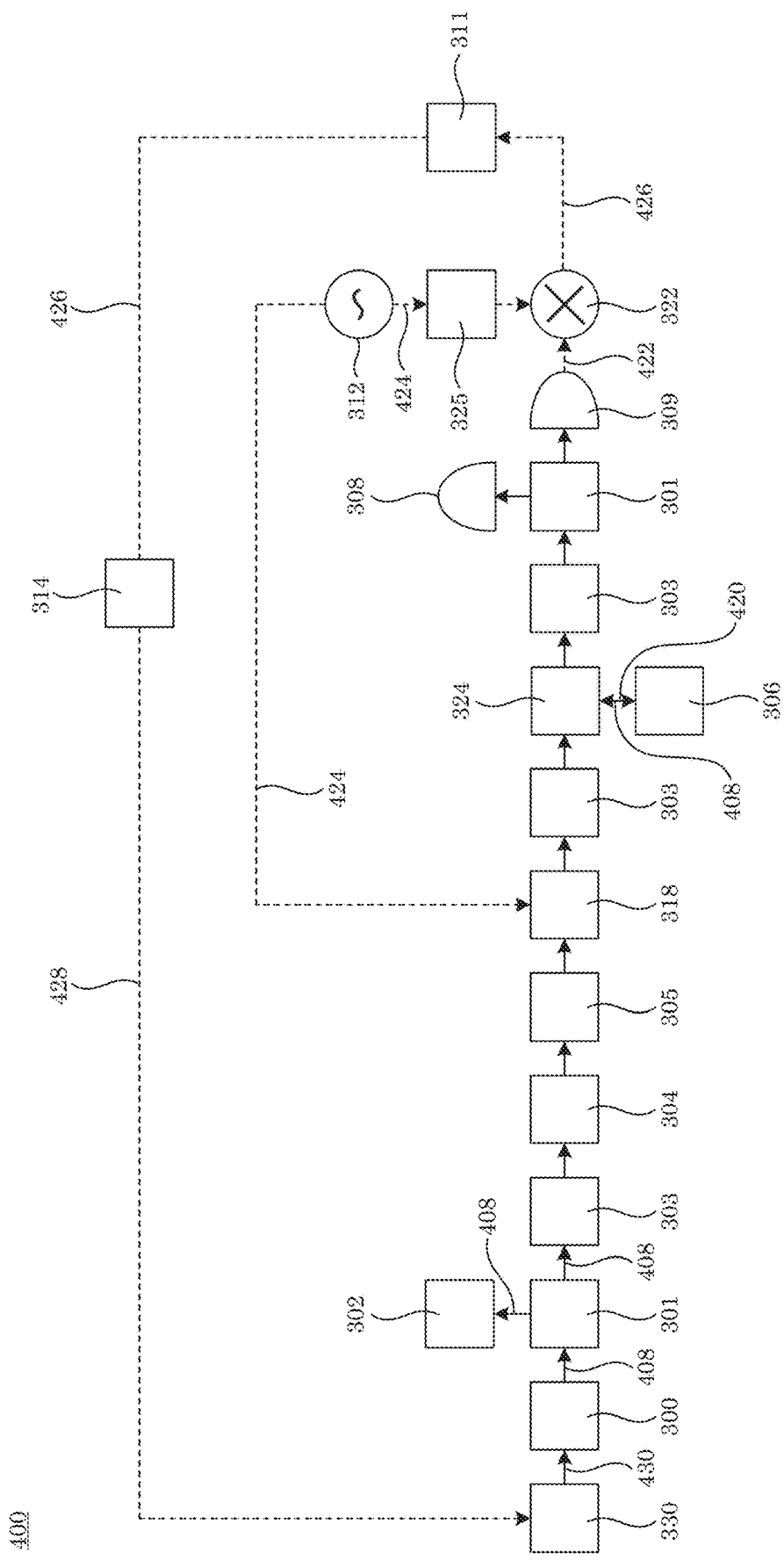
FIG. 5 shows a high-resolution photonic thermometer article.

A detailed description of one or more embodiments is presented herein by way of exemplification and not limitation.

It has been discovered that a high-resolution photonic thermometer article and processes described herein overcome technical limitations of conventional apparatus in performing high resolution thermometry. The high-resolution photonic thermometer article senses temperature variations on a µK-level with an on-chip integrated passive photonic thermometer with a high-quality factor photonic crystal cavity. The photonic crystal cavity can include a nanobeam photonic crystal cavity described in U.S. Pat. No. 8,798,414, the disclosure of which is incorporated herein in its entirety. Moreover, the high-resolution photonic thermometer article can include optical fiber coupling and chip-packaging that overcome conventional long-term drift of a resonant frequency of the photonic crystal cavity and also includes interrogation laser locking to read out resonance frequency of the photonic thermometer that is highly sensitive to temperature variations.

High-resolution photonic thermometer article 400 provides performance of high-resolution thermometry. In an embodiment, with reference to FIG. 1, FIG. 2, FIG. 3, FIG. 4, FIG. 5, and FIG. 6, high-resolution photonic thermometer article 400 includes light source 300. that receives control signal 428; and produces, based on control signal 428, primary light 408 that includes primary wavelength 410 and primary power 418. Photonic thermometer 306 is in communication with light source 300 and includes waveguide 402 and photonic crystal cavity 101. Waveguide 402 is in communication with photonic crystal cavity 101 and includes input light coupler 404 that receives primary light 408; photonic crystal cavity 101 in communication with the input light coupler 404 and that: interacts with primary light 408 from input light coupler 404, and stores primary light 408 when primary wavelength 410 matches resonance frequency 412 of photonic crystal cavity 101, such that an amount of primary light 408 stored in photonic crystal cavity 101 includes absorption power 416; and output light coupler 406 in communication with photonic crystal cavity 101. Output light coupler 406 receives primary light 408 as thermometer light 420 after primary light 408 has interacted with photonic crystal cavity 101. Thermometer light 420 includes transmission power 414 that is indirectly proportional to absorption power 416 of primary light 408 stored in photonic crystal cavity 101. Photodetector 309 is in communication with photonic thermometer 306 and receives thermometer light 420 from photonic thermometer 306; and produces photodetector signal 422 from thermometer light 420. Phase sensitive detector 313 is in communication with photodetector 309 and receives photodetector signal 422 from photodetector 309; receives reference frequency signal 424; and produces lock signal 426 from photodetector signal 422, based on reference frequency signal 424. Local oscillator 312 is in communication with phase sensitive detector 313 and produces reference frequency signal 424. Servo controller 314 is in communication with phase sensitive detector 313 and local oscillator 312 and receives lock signal 426 from phase sensitive detector 313; receives reference frequency signal 424 from local oscillator 312; and produces control signal 428 from lock signal 426 and reference frequency signal 424 such that absorption power 416 is maximized through wavelength control of light source 300 by control signal 428.

In high-resolution photonic thermometer article 400, transducer 315 can be electrically interposed between and in communication with light source 300 and servo controller 314. Transducer 315 receives control signal 428 from servo controller 314; produces transduction control signal 430 based on control signal 428; and communicates transduction control signal 430 to light source 300 to control production of primary wavelength 410 by light source 300. Wavelength meter 302 is in communication with light source 300 and receives primary light 408 from light source 300 and determines a wavelength of primary wavelength 410. Isolator 303, optical attenuator 304, polarization controller 305, or a combination of at least one of the foregoing optical elements is in communication with light source 300 and receives primary light 408 and varies a property of primary light 408. The property of primary light 408 that is varied can include a broadband light or a coherent light with a narrow linewidth to provide primary light 408 to photonic thermometer 306. Optical power meter 308 is in communication with photonic thermometer 306 and receives thermometer light 420 from photonic thermometer 306 and determines transmission power 414.

In an embodiment, with reference to FIG. 7, FIG. 8, FIG. 9, FIG. 10, FIG. 11, FIG. 12, FIG. 13, FIG. 14, FIG. 15, and FIG. 16, photonic thermometer 306 includes substrate 100 on which input light coupler 404 and photonic crystal cavity 101 are disposed. In some embodiments, high-resolution photonic thermometer article 400 includes V-groove fiber array 107 disposed on substrate 100, wherein V-groove fiber array 107 includes first optical fiber in communication with input light coupler 404 and that provides primary light 408 to input light coupler 404; and second optical fiber 116.1 in communication with output light coupler 406 and that receives thermometer light 420 from output light coupler 406.

Figure 8:
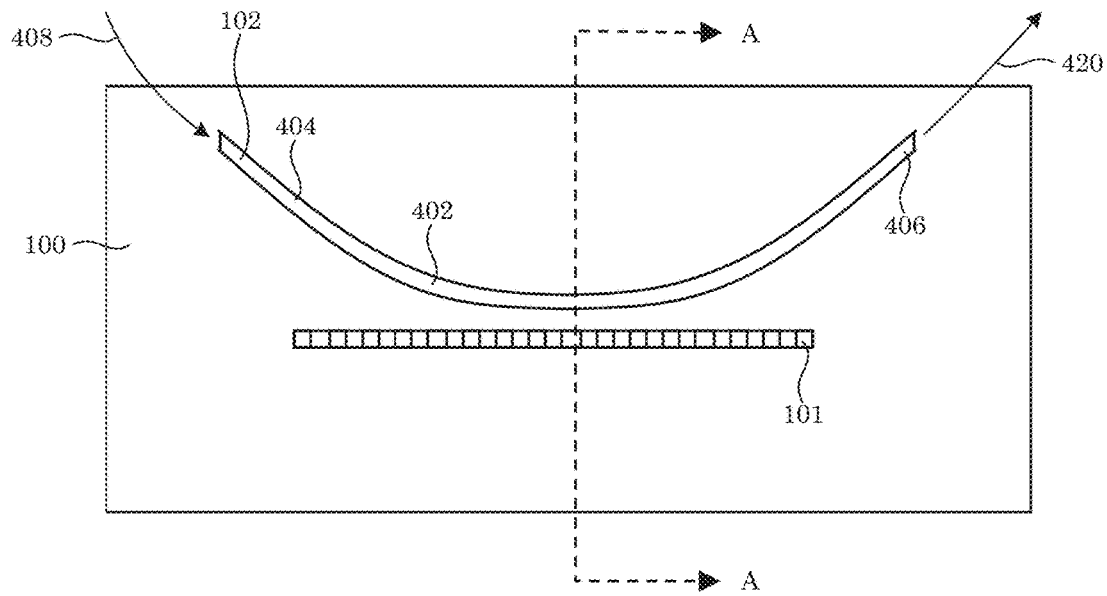
FIG. 8 shows a photonic thermometer in panel A and, in panel B, a cross-section along line A-A shown in panel A.
Figure 8:
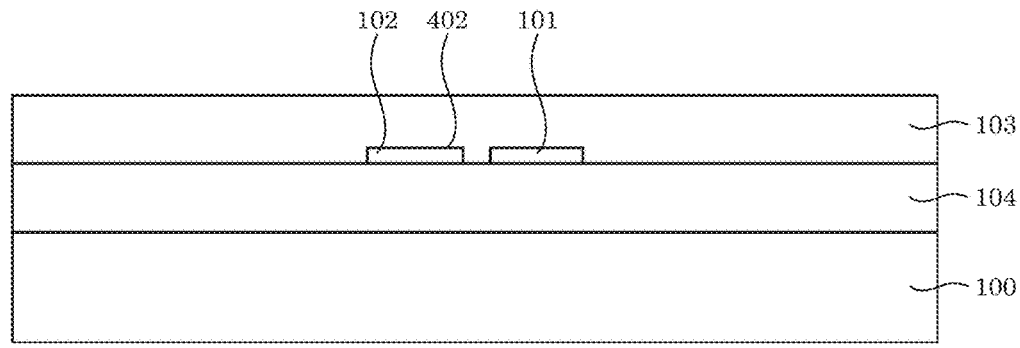
Figure 9:
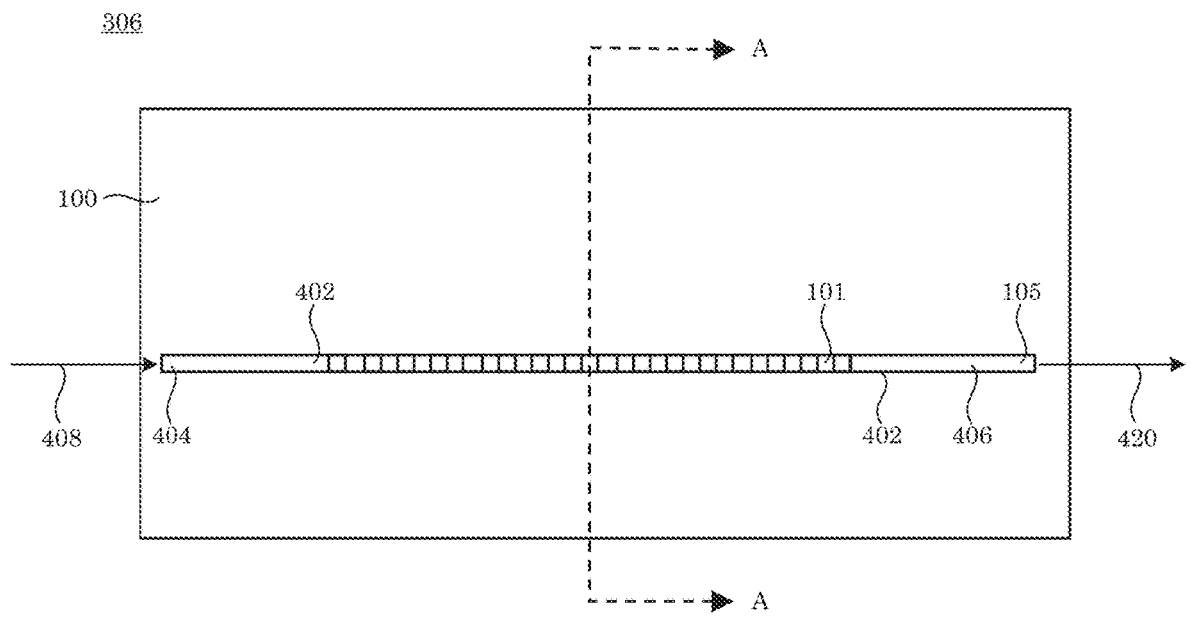
FIG. 9 shows a photonic thermometer in panel A and, in panel B, a cross-section along line A-A shown in panel A.
Figure 9:
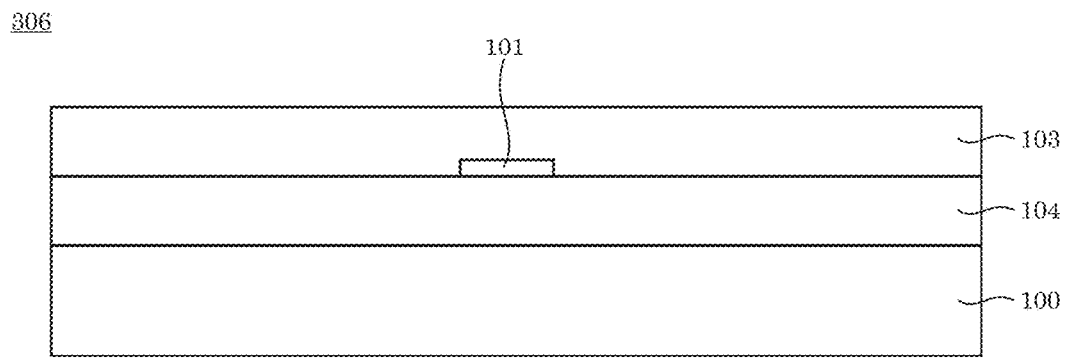
Figure 10:
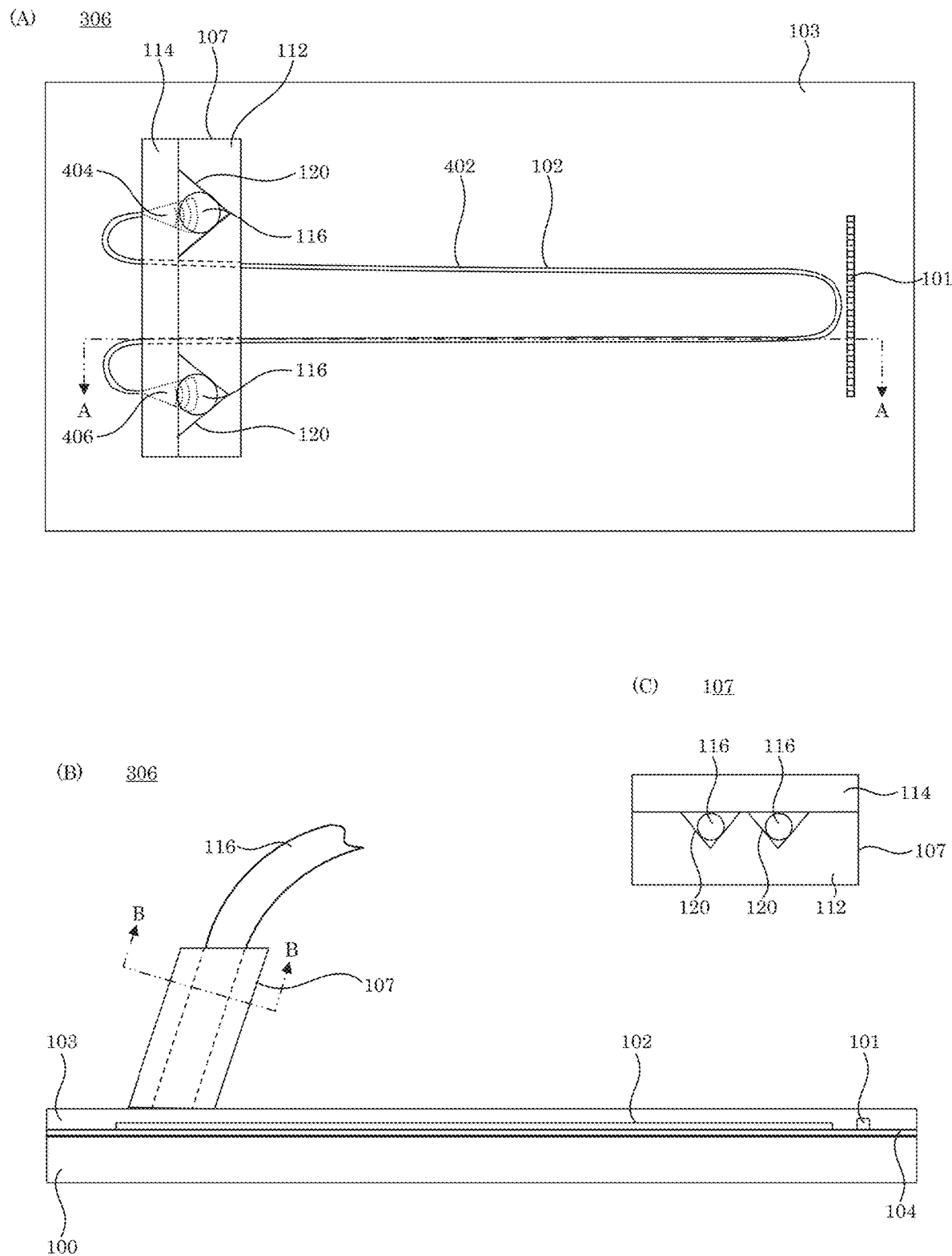
FIG. 10 shows a photonic thermometer in panel A; in panel B, a cross-section along line A-A shown in panel A; and, in panel C, a cross-section along line B-B shown in panel B.
Figure 11:
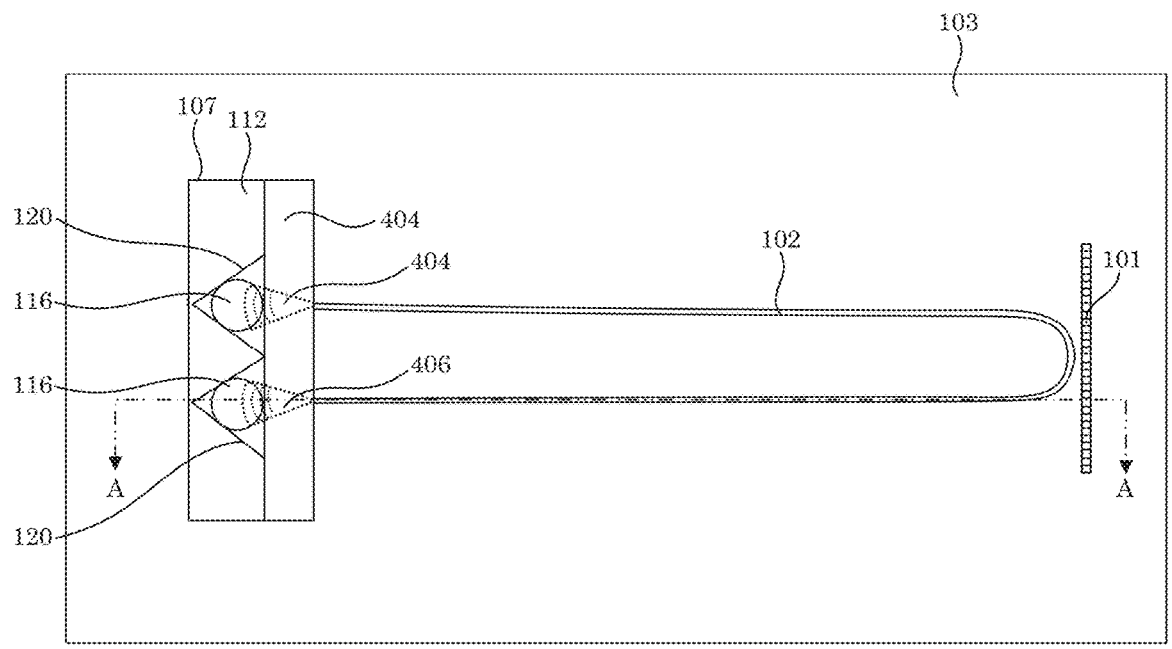
FIG. 11 shows a photonic thermometer in panel A; in panel B, a cross-section along line A-A shown in panel A; and, in panel C, a cross-section along line B-B shown in panel B.
Figure 11:
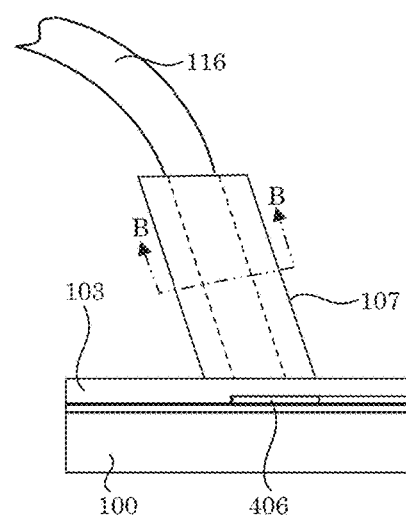
Figure 11:
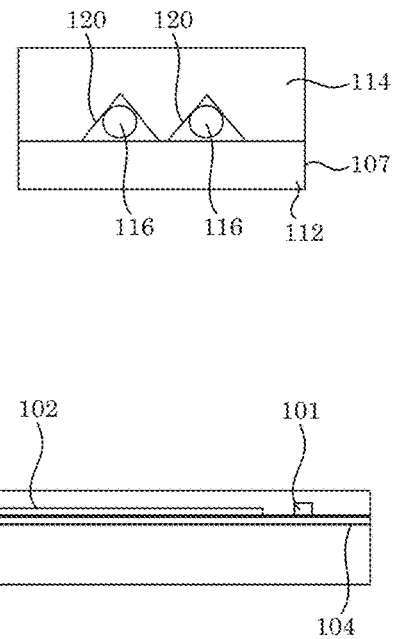
Figure 12:
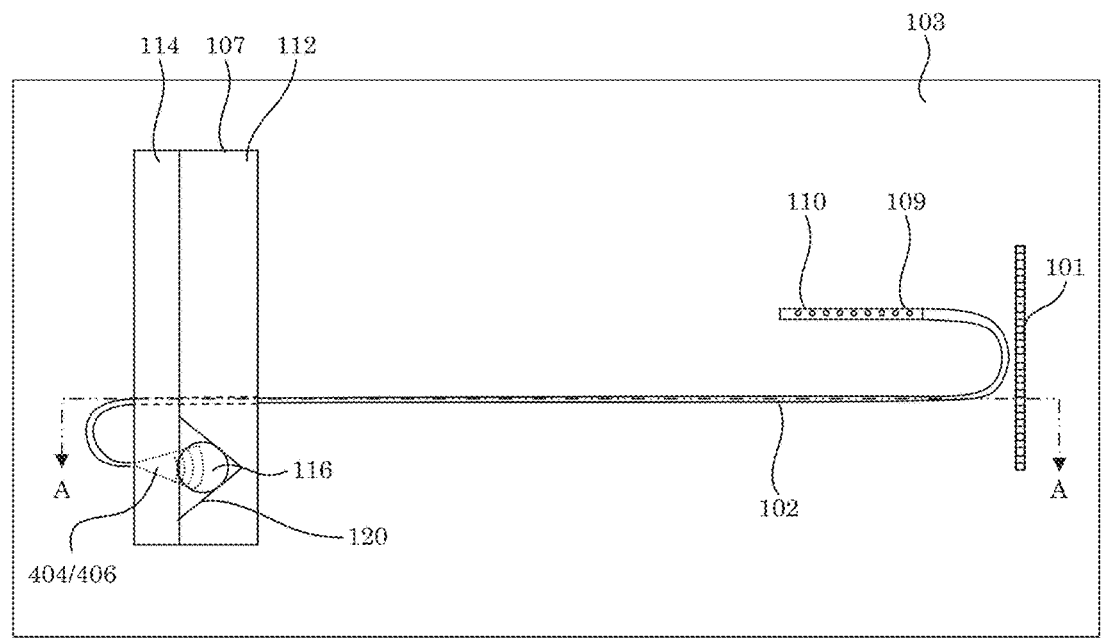
FIG. 12 shows a photonic thermometer in panel A; in panel B, a cross-section along line A-A shown in panel A; and, in panel C, a cross-section along line B-B shown in panel B.
Figure 12:
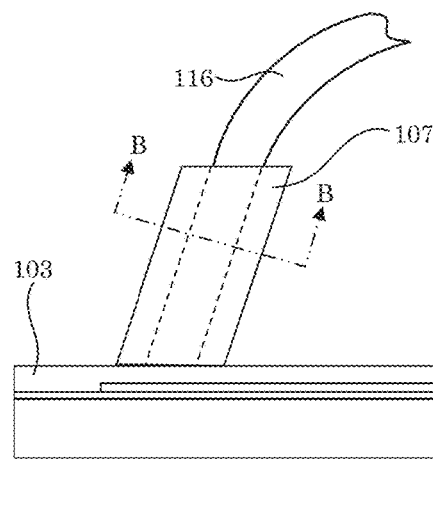
Figure 12:
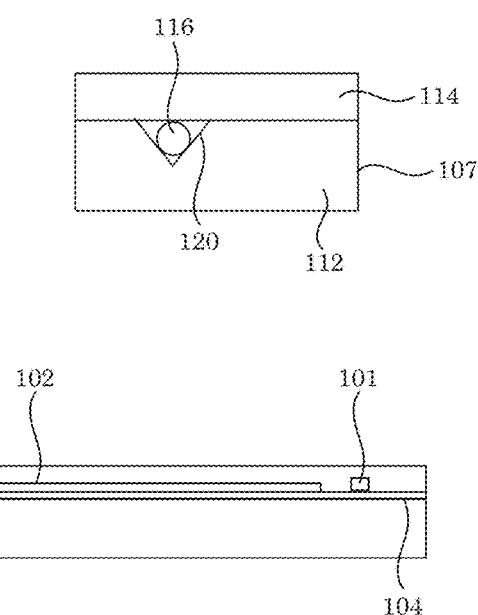
Figure 13:
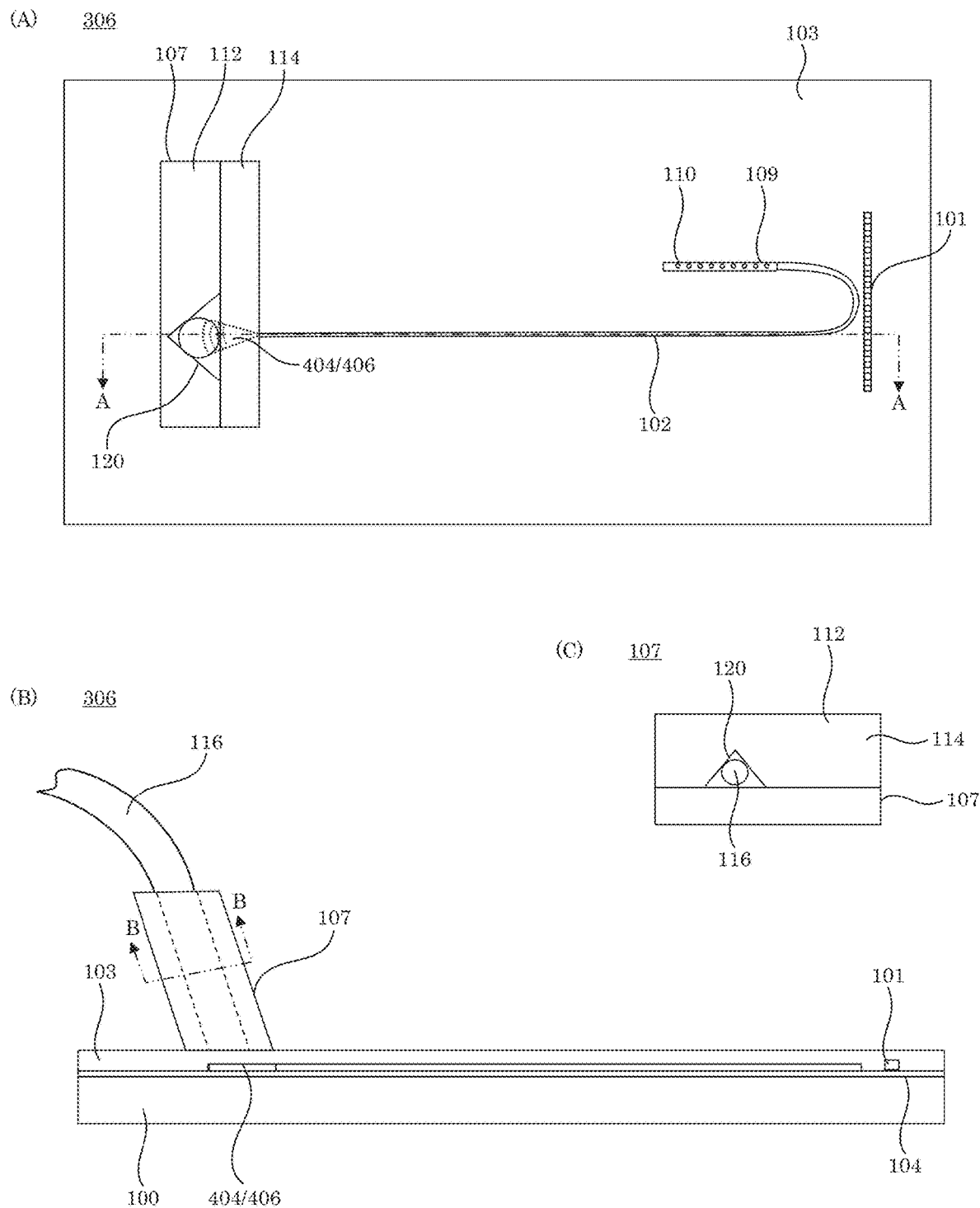
FIG. 13 shows a photonic thermometer in panel A; in panel B, a cross-section along line A-A shown in panel A; and, in panel C, a cross-section along line B-B shown in panel B.

According to an embodiment, with reference to FIG. 8, waveguide 402 can be bus waveguide 102 separated from photonic crystal cavity 101 by a distance that provides for evanescent coupling between bus waveguide 102 and photonic crystal cavity 101. In some embodiments, with reference to FIG. 9, waveguide 402 is direct-couple waveguide 105 in which photonic crystal cavity 101 is interposed between input light coupler 404 and output light coupler 406. In an embodiment, with reference to FIG. 10, waveguide 402 is reflection photonic crystal 432.

Figure 16:
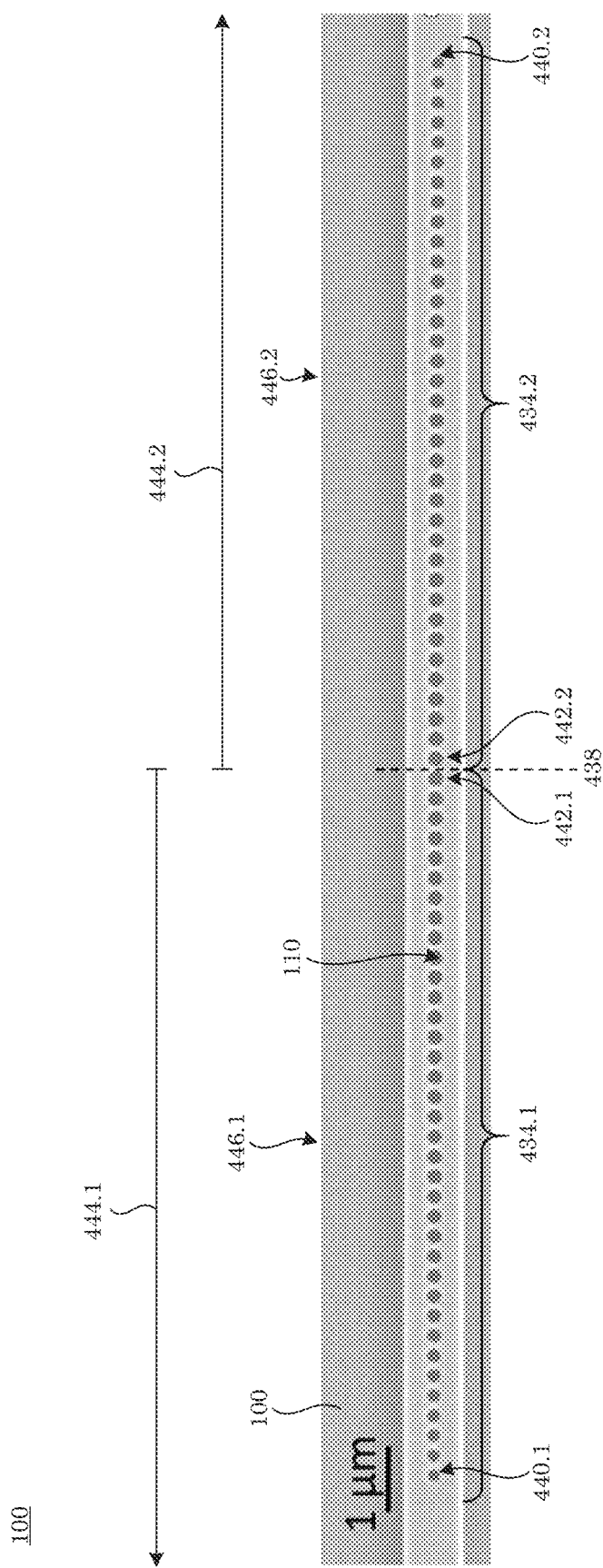
FIG. 16 shows a photonic crystal cavity.
Figure 19:
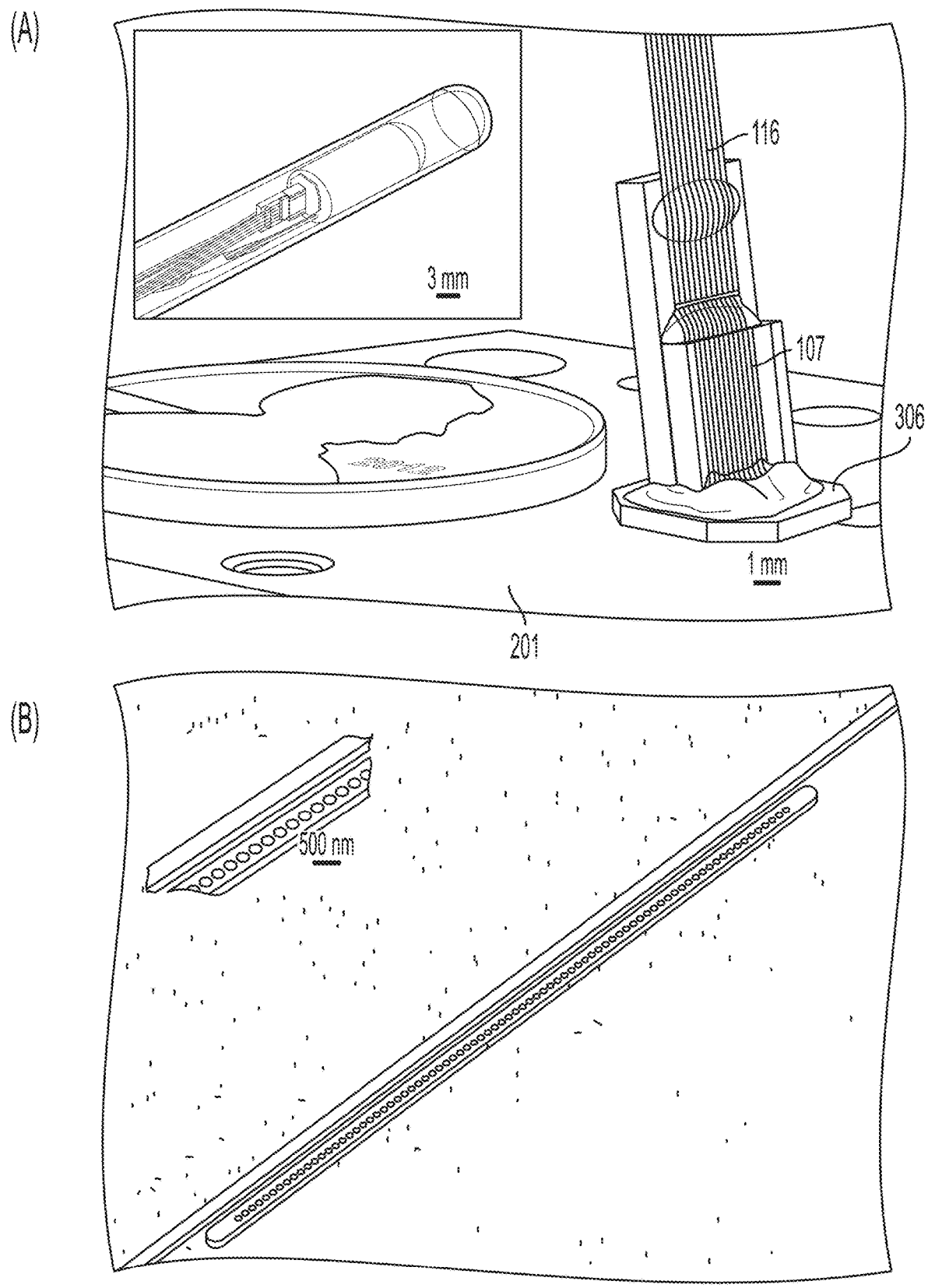
FIG. 19 shows, in panels A and B, a zoomed view of the high-resolution photonic thermometer article shown in FIG. 17.

In an embodiment, with reference to FIG. 16 and panel B of FIG. 19, photonic crystal cavity 101 includes first modulated Bragg mirror 434.1 including first set 446.1 of a plurality of photonic apertures 436; and second modulated Bragg mirror 434.2 in communication with first modulated Bragg mirror 434.1 and including second set 446.2 of a plurality of photonic apertures 436. Photonic apertures 436 in the first set 446.1 independently include a radius; and are arranged sequentially by a size of the radius of each photonic aperture 110 such that a radial size of sequential photonic apertures decreases along a first taper direction 444.1 that is directed away from the second .2. Photonic apertures 436 in second set 446.2 independently comprise a radius; and are arranged sequentially in a row by a size of the radius of each photonic aperture 110 such that a radial size of sequential photonic apertures decreases along a second taper direction 444.2 that is directed away from the first set 446.1. Further, first set 446.1 and second set 446.2 are adjacently disposed at zero-length cavity 438 that is an origin of first taper direction 444.1 and second taper direction 444.2. An exemplary photonic crystal cavity and formation thereof is provided in U.S. Pat. No. 8,798,414, the disclosure of which is incorporated herein in its entirety.

Figure 17:
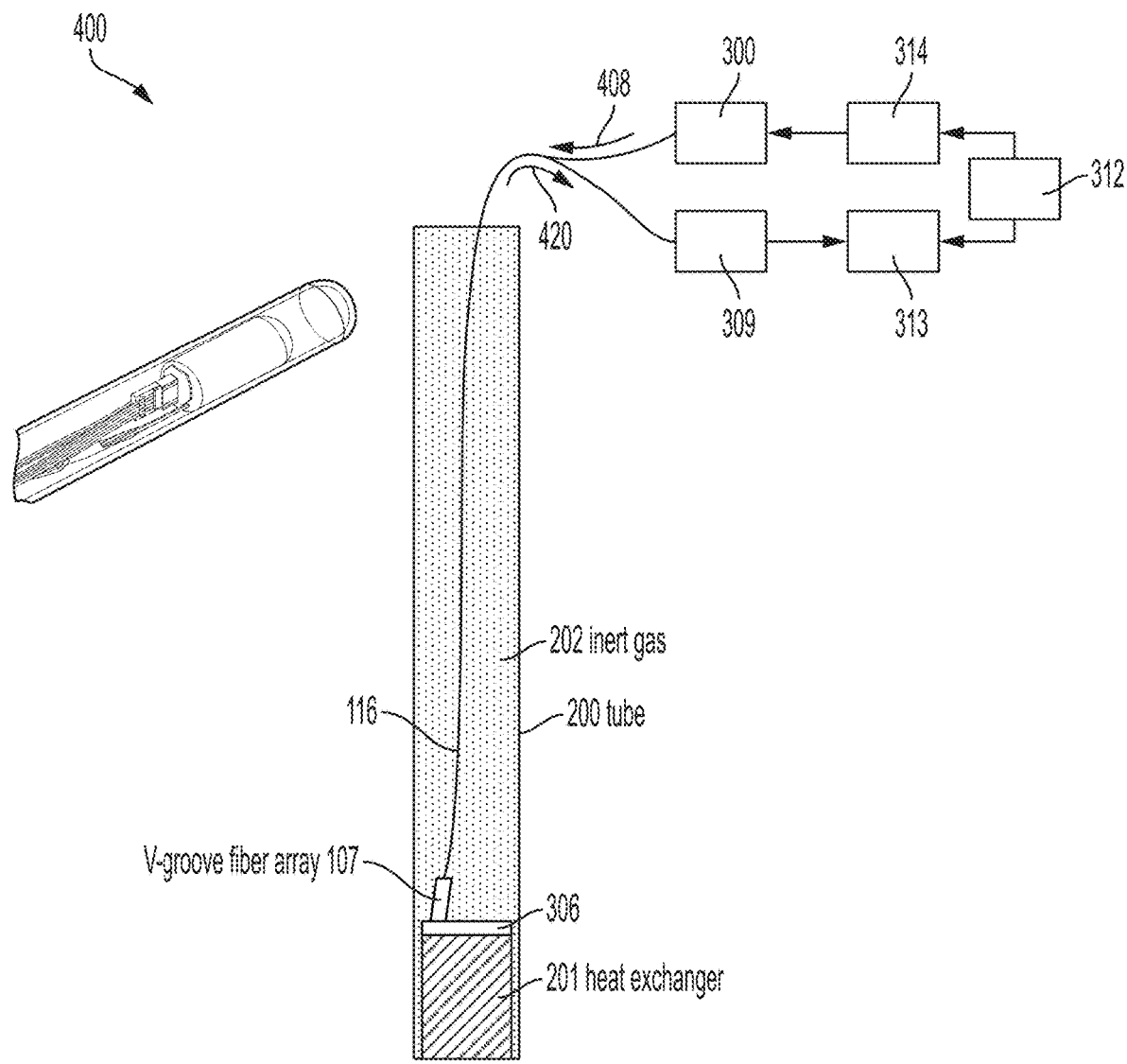
FIG. 17 shows a high-resolution photonic thermometer article.
Figure 18:
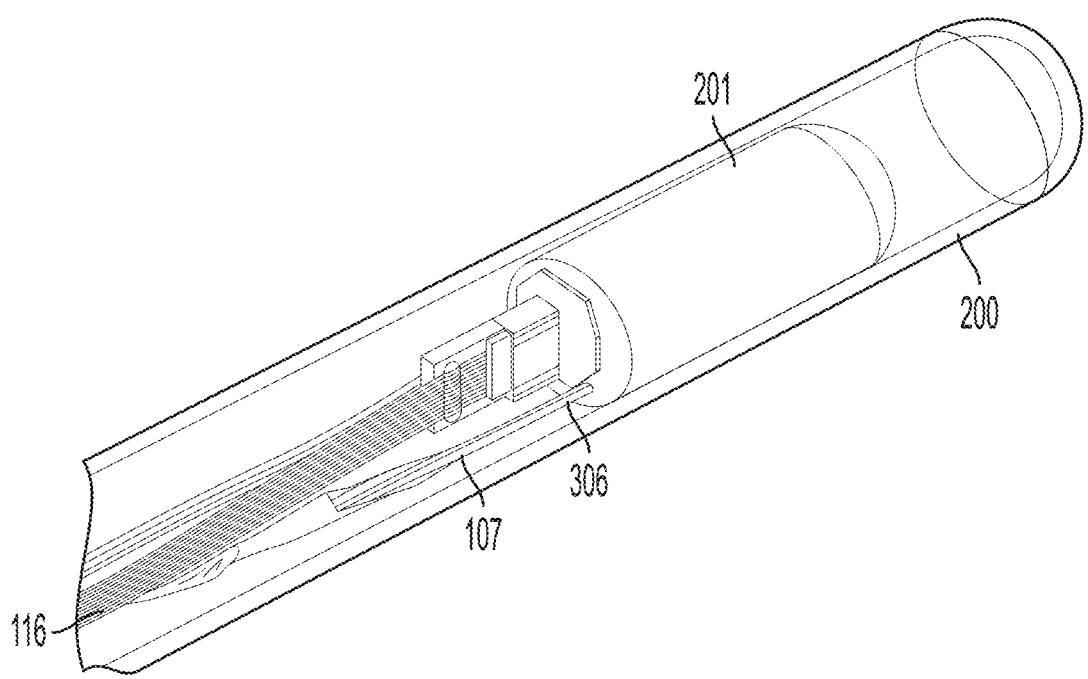
FIG. 18 shows, in panels A and B, a zoomed view of the high-resolution photonic thermometer article shown in FIG. 17.
Figure 18:
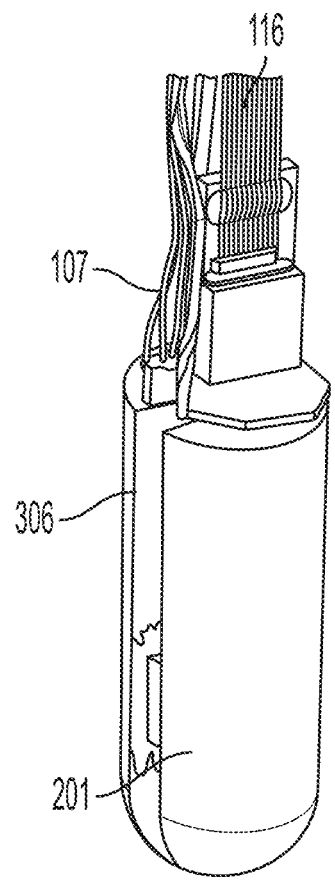

In an embodiment, with reference to FIG. 17, FIG. 18, and FIG. 19, high-resolution photonic thermometer article 400 includes heat exchanger 201 in thermal communication with photonic thermometer 306. Tube 200 is provided and has an inner volume in which photonic thermometer 306 and heat exchanger 201 are disposed. It is contemplated that inert gas 202 is disposed in tube 200, wherein inert gas 202, photonic thermometer 306, and heat exchanger 201 are hermetically sealed in tube 200.

High-resolution photonic thermometer article 400 includes elements to produce thermometer light 420 controlled by control signal 428. It is contemplated that transducer 315 can change the frequency of light source 300 and can include a piezo-actuator that changes the cavity length. Exemplary transducers 315 include a piezo-actuation element, current transducer, Peltier heater and or cooler. In an embodiment, transducer 315 includes piezo-actuator that changes the cavity length.

Light source 300 produces primary light 408. Primary light 408 can include light a broadband source or a coherent light source with a narrow linewidth to provide primary light 408 to photonic thermometer 306, and can be a light emitted diode, arc lamp, infrared laser, visible laser, ultraviolet laser, and the like. Exemplary primary lights 408 include a tunable diode laser. Moreover, primary light 408 is emitted form a C-band tunable laser. A wavelength of primary light 408 can be from 200 nm to 10 μm, specifically from 400 nm to 3 μm, and more specifically from 500 nm to 2 μm. A power of primary light 408 can be from 10 nW to 100 mW, specifically from 50 nW to 50 mW, and more specifically from 100 nW to 10 mW. In an embodiment, primary light 408 includes light from C-band tunable laser in a wavelength from 1520 nm to 1570 nm and with a laser power from 0.1 mW to 20 mW.

Primary light 408 is converted to thermometer light 420 in photonic thermometer 306. Thermometer light 420 can include light transmitted along waveguide 402 with a reduced transmission at the resonant frequency of the photonic thermometer 306. A wavelength of thermometer light 420 can be from 200 nm to 10 μm, specifically from 400 nm to 3 μm, and more specifically from 500 nm to 2 μm. A power of thermometer light 420 can be from 10 nW to 100 mW, specifically from 50 nW to 50 mW, and more specifically from 100 nW to 10 mW. In an embodiment, thermometer light 420 includes light from C-band tunable laser in a wavelength range from 1520 nm to 1570 nm and laser power from 0.1 mW to 20 mW which passed through the photonic thermometer 306.

Beam splitter 301 can split or combine light. Exemplary beam splitters 301 include a waveguide-based splitter that couples incoming light flux propagating through an incoming waveguide to two or more waveguides. Moreover, beam splitter 301 is optionally used to provide a portion of the light to wavelength monitor 302, optical power meter 308, photodetector 309, and the like. Moreover, beam splitter 301 can provide a portion of the light to optical power meter 308, wavelength monitor 302, and the like. In an embodiment, beam splitter 301 provides 10% of primary light 408 to wavelength monitor 302, and 90% of light incident from light source is directed to photonic thermometer 306. Moreover, in an embodiment, beam splitter 301 provides 50% of thermometer light 420 to an optical power meter 308, and 50% of thermometer light 420 to photodetector 309.

Optical circulator 324 is a three-port or four-port non-reciprocal optical device designed that light entering any port exits from the next port. Optical circulator 324 allows light to travel in only one direction. In embodiment, optical circulator 324 is a fiber optics circulator in which properties of light passing through the device are not reversed when light changes direction from forward to backward. Exemplary optical circulator 324 can separate propagating forward in fiber optics light and reflected backward in fiber optics light. Exemplary optical circulators include a Faraday rotator. In an embodiment, optical circulator 324 is a single mode fiber or polarization maintaining fiber optics device.

Wavelength monitor 302 determines a wavelength of light incident thereon. Exemplary wavelength monitors 302 include a diffraction grating, spectrometer, spectrum analyzer, etalon, wavelength cell, frequency comb, and the like. Moreover, wavelength monitor 302 produces a wavelength signal that can include a voltage of other electric or photonic signal whose characteristics are determined by the measured wavelength and a specified calibration. Exemplary wavelength signals include DC voltages, a frequency of AC voltages, DC electric currents, microwave signals, and spectra dispersed by a diffraction grating. Moreover, wavelength monitor 302 can determine the frequency of light incident on it. In an embodiment, wavelength monitor 302 produces analog DC voltage signal, and the wavelength value displayed on a computer.

Optical isolator 303 can include a magneto-optic device in which light travels in a forward direction and prevents transmission of the light in the direction. Exemplary optical isolators 303 include Faraday effect isolators. Moreover, optical isolator 303 can operate in the infrared, visible, or UV frequency range. In an embodiment, optical isolator 303 includes a fiber-optic, fiber coupled with single-mode, or polarization maintaining single-mode fiber, e.g., with optical isolation from 10 dB to 100 dB, specifically from 20 dB to 80 dB, and more specifically from 30 dB to 60 dB.

Optical attenuator 304 can include free space or fiber-optic that produces attenuation of optical power of incident light. Exemplary optical attenuators 304 include a single mode, multimode, or polarization-maintaining optical attenuator. Moreover, optical attenuator 304 can operate in the infrared, visible, and UV frequency range. Furthermore, optical attenuator 304 can have fixed attenuation or variable attenuation. In an embodiment, optical attenuator 304 includes fiber-optic variable or fixed attenuator with attenuation from 1 dB to 100 dB, specifically from 2 dB to 80 dB, more specifically from 3 dB to 60 dB.

Polarization controller 305 can include a free-space or fiber-optic device that manipulates the polarization of light. Exemplary polarization controllers 305 include birefringent crystals and calcite polarizers. Moreover, polarization controller 305 includes fiber-optic stress-induced birefringence that converts between linear, circular, and elliptical polarization of light. In an embodiment, polarization controller 305 can include fiber-optic with stress-induced birefringence to make two or three independent fractional wave plates to alter polarization in a single mode fiber. Moreover, in an embodiment, polarization controller 305 includes an in-line polarization controller that transforms an arbitrary input polarization of light to arbitrary output polarization of light using a quarter-wave, half-wave, or other wave plate.

Optical power meter 308 can absorb incident light and quantify an effect from absorption, wherein the effect is proportional to the amount of the light absorbed. Exemplary optical power meter 308 includes photodiodes and bolometers. Moreover, a device with a response that is proportional to the power of light incident upon it may be incorporated into a power meter. Output signal from optical power meter 308 produces power signal that can include DC voltages and DC currents. In an embodiment, optical power meter 308 includes a germanium-based photodiode that, when a light is absorbed in the photodiode, an electron-hole pair is formed within the device, and a voltage is produced across the photodiode junction, in which measuring a photocurrent between photodiode terminals provides a measure of the optical power incident upon a detector.

Photodetector 309 receives incident light from which it produces frequency signal, photodetector signal 422. Exemplary photodetectors 309 include InGaAs and Si photodiodes. In an embodiment, photodetector 309 produces a measurable voltage or current that can be quantified, in response to incident light. Thermometer light 420 is converted to photodetector signal 422 by photodetector 309. Photodetector signal 422 can include a measurable voltage or current signal that is proportional to incident light. Moreover, a photodetector signal 422 can include a voltage or other electric signal. In embodiment, photodetector signal 422 is produced by a germanium-based photodiode, wherein when light is absorbed by the photodiode, an electron-hole pair is formed within the device, and a voltage is developed across the photodiode junction, measuring a photocurrent between photodiode terminals provides a measure of the optical power incident upon a detector. Exemplary photodetectors include a power meter, photodiode, and photoreceiver. Examples of photodetector 309 include an InGaAs or Si photodiode. A bandwidth of photodetector 309 can be between 0 Hz and 10 GHz, specifically from 100 Hz to 5 GHz, and more specifically from 1 kHz to 1 GHz.

Amplifier 310 can include electronic current or voltage amplifier that amplifies signal from a photodetector 309 by a factor from 2 to a factor to 10000. Exemplary amplifiers 310 include a differential amplifier and transimpedance amplifier.

Filter 311 can include a low pass electrical filter that cuts off a high-frequency component of the electrical signal. Filter 311 can be in communication phase sensitive detector 313. In an embodiment, filter 311 includes a low pass with high-frequency cutoff from 1 kHz to 10 MHz, specifically from 2 kHz and 1 MHz, and more specifically between 10 kHz and 100 kHz.

Phase sensitive detector 313 can include a mixer, low pass filter, local oscillator 312, or amplifier 310. Exemplary phase sensitive detectors 313 include a lock-in amplifier. Moreover, the lock-in amplifier can discriminate signal in noisy environment. In an embodiment, phase sensitive detector 313 includes a mixer, low pass filter, local oscillator, and amplifier. These components can be packaged together in the form of lock-in amplifier that is used to detect small changes in the phase of the laser light. Photodetector signal 422 is converted to lock signal 426 by photodetector 309. Lock signal 426 is an electrical signal that can be from 1 nV to 100 V, specifically from 1 uV to 20 V, and more specifically from 1 mV to 10 V.

Local oscillator 312 can include microwave source, or radio frequency source that produces a frequency in the microwave and or radio frequency range. Exemplary local oscillator 312 includes a signal generator. Moreover, the frequency produced is coherent, and located in the band from 1 Hz to 10 GHz, specifically from 10 Hz to 1 GHz, and more specifically from 100 Hz to 100 MHz. In an embodiment, local oscillator 312 includes a signal generator with a phase control and operating radio frequency range. Local oscillator 312 produces oscillating electric signal reference frequency signal 424. Reference frequency signal 424 can include a signal from a signal generator or from a lock-in amplifier. Moreover, reference signal 424 can be a signal from 10 Hz to 10 HGz. A reference frequency signal 424 can be from 1 Hz to 10 GHz, specifically from 10 Hz to 1 GHz, and more specifically from 100 Hz to 100 MHz. Reference frequency signal 424 can be used to control electro-optic phase modulator 318. Reference frequency signal 424 is within the range of operation of electro-optic phase modulator 318.

Servo controller 314 can include an electronic instrument that can be used for feedback control applications. In embodiment, servo controller 314 is used for adjusting the frequency of the light source 300 (laser). Exemplary servo controllers 314 include an instrument that feeds the error signal back to the transducer 315 that modulate the light source 300. In an embodiment, servo controller 314 includes three stages differential amplifier stage that generates an error signal, PID filter stage that filter error signal to generate feedback signal, and output stage that provides the control signal 428. Moreover, in an embodiment, PID filter stage adjusts control signal 428 to keep an error signal at zero. In embodiment, servo controller 314 produces control signal 428. Control signal 428 can include dither error signal, Pound-Drever-Hall error signal, and the like. Moreover, the bandwidth of the servo controller 314 can be from 100 Hz to 1 GHz, specifically from 1 kHz to 500 MHz, and more specifically from 10 kHz to 100 MHz. The control signal 428 can be from −20 V to +V, specifically from −15 V to +15 V, and more specifically from −10 V to +10V.

Electro-optic phase modulator 318 is a fiber-coupled or a free space device, whose refractive index changes with applied voltage with a fast response time on the order of a nanosecond. The result of voltage modulation on electro-optic phase modulator 318 318 leads to frequency modulation of laser 316. Exemplary electro-optic phase modulators 318 include fiber-based electrooptic crystal driven to phase modulate light travelling though the fiber. Moreover, electoroptic phase modulator 318 can include lithium-niobate crystal. In an embodiment, electro-optic phase modulator 318 includes electro-optic crystal that modulate phase of light. Phase modulation depth generated by electro-optic phase modulator 318 can be from 0.001 to 0.1, specifically from 0.005 to 0.1, and more specifically from 0.01 to 0.1.

Mixer 322 can include a non-linear device for generating an error signal, that goes into the servo controller 314 to generate a control signal to adjust the frequency of laser 300.

Photonic thermometer 306 includes substrate 100. Substrate 100 can include a material that can be processed (e.g., micromachined, including lithography and the like) to form a support structure for photonic thermometer 306. Exemplary substrates 100 include wafers or dies of silicon, sapphire, silicon carbide or III-V materials. A thickness of substrate 100 can be from 100 μm to 10 mm, specifically from 250 μm to 1 mm, and more specifically from 550 μm to 680 μm. In an embodiment, substrate 100 includes a semiconductor. An exemplary semiconductor is an element from group 11, 12, 13, 14, 15, or 16 (IUPAC nomenclature, which respectively is identical to group I, II, III, IV, V, or VI) of the periodic table such as a Si, Ga, Ge, As, In, Sn, Sb, Te, At, Hf, Zn, and the like, or a combination thereof. According to an embodiment, substrate 100 is a compound semiconductor such as SiC, SiGe, GaN; a group 13-15 (also referred to as a group III-V) semiconductor such as AlSb, AlAs, AlN, AlP, BN, GaSb, GaAs, GaN, GaP, InSb, InAs, InN, InP, and the like; a group 12-16 (group II-VI) semiconductor such as CdSe, CdS, CdTe, ZnO, ZnSe, ZnS, ZnTe, and the like; a group 11-17 (group I-VII) semiconductor such as CuCl and the like; a group 14-16 (group IV-VI) semiconductor such as PbS, PbTe SnS, and the like; a layer semiconductor such as PbI2, MoS2, GaSe, and the like; an oxide semiconductor such as CuO, Cu2O, and the like; (Al,Ga)N, (Al,Ga)As, (In,Ga)As, (Al,Ga)Sb, (In,Ga)Sb, as well as nitride, arsenide, antimonide quaternary III-V alloys, or a combination comprising at least one of the foregoing. Examples of II-VI alloys include, but are not limited to CdSe, CdTe, CdS, ZnSe, and combinations thereof. Examples of Group III-V ternary alloys include, but are not limited to, (Ga,Al)As, (In,Ga)As, and combinations thereof. Exemplary Group III-V quaternary alloys include (Ga,In)(As,P), (In,Al,Ga)Sb, and the like. Exemplary Group III-nitride alloys include (Ga,Al)N, (Ga,In)N, (Al,In)N, (Ga,Al,In)N, and combinations thereof. Quaternary alloys of the above may also be employed.

Substrate 100 also can include a supplemental element such as C, H, N, Li, Na, K, Mg, Ca, Sr, Ba, Bi, B, Al, P, S, O, and the like in an amount typically less than an amount of the semiconductor. In an embodiment, common substrate 100 includes silicon, and the silicon is optionally doped. According to an embodiment, the semiconductor is an intrinsic semiconductor or an extrinsic semiconductor doped with a selected dopant, e.g., a p-dopant or an n-dopant. In one embodiment, the substrate includes a p-dopant. In another embodiment, substrate 100 includes an n-dopant. In a particular embodiment, substrate 100 is p-doped Si. In one embodiment, substrate 100 is n-doped Si. Substrate 100 can be produced from, e.g., commercially available semiconductor grade p-doped Si having a particular crystalline orientation, e.g., having Miller indices <111>, <100>, and the like. Substrate 100 can be amorphous, polycrystalline, or a single crystal. In an embodiment, substrate 100 has a stacked structure that includes a plurality of semiconductor layers such as by forming films as SiGe/Si/SiGe/Si on a Si substrate. In some embodiments, substrate 100 includes crystalline domains among amorphous material.

In another embodiment, substrate 100 includes a glass, Pyrex, sapphire, polymer, ceramic, or an electrically conductive material, e.g., a metal. The substrate can be electrically conductive, semiconductive, or electrically insulating.

A thermal conductance of substrate 100 can be selected by choice of a composition of common substrate 226 as well as a geometrical shape or size of substrate 100. A thermal conductivity of substrate 100 can be from 0.1 to 5000 W/mK, specifically from 0.5 W/mK to 100 W/mK and more specifically from 1 W/mK to 5 W/mK.

Substrate 100 can include a plurality of layers such buried oxide 104 and top-cladded oxide 103 on a base layer, e.g., of silicon.

In photonic thermometer 306, buried oxide 104 can be disposed on substrate 100 to generally isolate the photonic thermometer 306 from the substrate 100. In an embodiment, the buried oxide 104 insulates photonic thermometer 306 from substrate 100. The buried oxide 104 can include an oxide of an element in buried oxide 104 or independently can be an oxide of a semiconductor material such as $SiO_2$. In an embodiment, substrate 100 includes Si, and buried oxide 104 includes silicon dioxide ($SiO_2$). Additional buried oxide 104 materials include gallium oxide ($GaO_3$), aluminum oxide ($Al_2O_3$), or alloys thereof, oxides of compounds from Groups III and V or alloys thereof, and the like. Exemplary oxides in the buried oxide 104 also include ZnO, $HfO_2$, $SnO_2$, $In_2O_3$, $Zn_2SnO_4$, $Ga_2O_3$, $Al_2O_3$, and the like. In an embodiment, the buried oxide 104 is a product of oxidation of a portion of substrate 100 to produce the semiconductor oxide. According to one embodiment, the buried oxide 104 is a product of rapid thermal oxidation of substrate 100 so that the oxide (the dielectric layer) is derived from substrate 100. In another embodiment, the buried oxide 104 is a product of low temperature oxidation of substrate 100 to produce an oxide. In a further embodiment, the buried oxide 104 is a product of depositing the oxide on substrate 100, which may or may not involve oxidation of substrate 100. Moreover, the buried oxide 104 may be bonded to the substrate 100. In a certain embodiment, the d buried oxide 104 includes $SiO_2$ as the oxide, which is a product of oxidation of substrate 100 that includes Si. In some embodiments, the buried oxide 104 includes a semiconductor oxide, a ceramic (e.g., $ZrO_2$, $Al_2O_3$, SiC, $Si_3N_4$, BN, $BaTiO_3$, and the like), a glass, a polymer, or a combination thereof. In some embodiments, the buried oxide includes an organic compound such as a polymer, e.g., cellulose, poly(methyl methacrylate), and the like.

A thickness of buried oxide 216 can be from 0.25 μm to 10 μm, specifically from 0.5 μm to 5 μm, and more specifically from 1 μm to 3 μm. A thermal conductivity of dew sensor substrate 216 can be from 0.1 W/mK to 1000 W/mK, specifically from 0.5 W/mK to 100 W/mK, and more specifically from 1 to 5 W/mK.

Top-cladded oxide 103 can include the same composition, properties and function as buried oxide 104. Moreover, the top-cladded oxide 103 can serve as encapsulation layer that seal the photonic thermometer 306 from environmental factors such as humidity and moisture, dust, chemical depositions that can change the effective refractive index of photonic thermometer 306, and the like. In an embodiment, top-cladded oxide 103 includes the top-cladded oxide 103 is a product of depositing the oxide on substrate photonic thermometer 103. Moreover, the top-cladded oxide 103 may be bonded to the directedly on top of photonic thermometer 306.

Further with regard to photonic thermometer 306, waveguide 402 receives primary light 408 and communicates thermometer light 420 therefrom. Waveguide 402 guides light along a path and can be a structure on or over a substrate which guides light along the axial direction and confines it in the transverse directions. Exemplary waveguides 402 include rib waveguides and ridge waveguides. Moreover, the waveguide may contain coupling elements to bring light into and out of the waveguide, such as Bragg grating couplers or inverse tapers, and the like. A size, i.e., a transverse cross-section dimension relative to a propagation path of primary light 408 in waveguide 402, can be from 20 nm to 20 μm, specifically from 50 nm to 5 μm, and more specifically from 200 nm to 1 μm. A transmission loss of waveguide 402 can be from 0.1 dB/cm to 50 dB/cm, specifically from 0.5 dB/cm to 10 dB/cm, and more specifically from 1 dB/cm to 4 dB/cm at a wavelength from 500 nm to 10 μm, specifically from 750 nm to 4 μm, and more specifically from 1 μm to 2.5 mm. In an embodiment, waveguide 402 guides light along a path; can have dimensions from 300 nm to 1 μm width, 200 nm to 500 nm height; can include silicon and similar materials; and can operate at a wavelength from 1 μm to 2.5 μm.

Input light coupler 404 receives primary light 408 and output light coupler 406 communicates thermometer light 420. Input light coupler 404 and output light coupler 406 can include surface Bragg grating coupler, inverse taper, edge coupler, and the like. Output light coupler 406 communicates thermometer light 420. Moreover, input light coupler 404 and output light coupler are disposed at a terminus of the waveguide 402.

Bragg grating coupler 403 is disposed at the terminus of waveguide 102 as shown in FIGS. 10-13, panel A. Bragg grating coupler 403 includes a plurality of protrusions and depressions alternatingly disposed on buried oxide 104. It is contemplated that a Bragg grating coupler 403 uses a grating structure (e.g., alternating protrusions and depressions) to couple input light into and output light out of the photonic crystal cavity 101.

Figure 14:
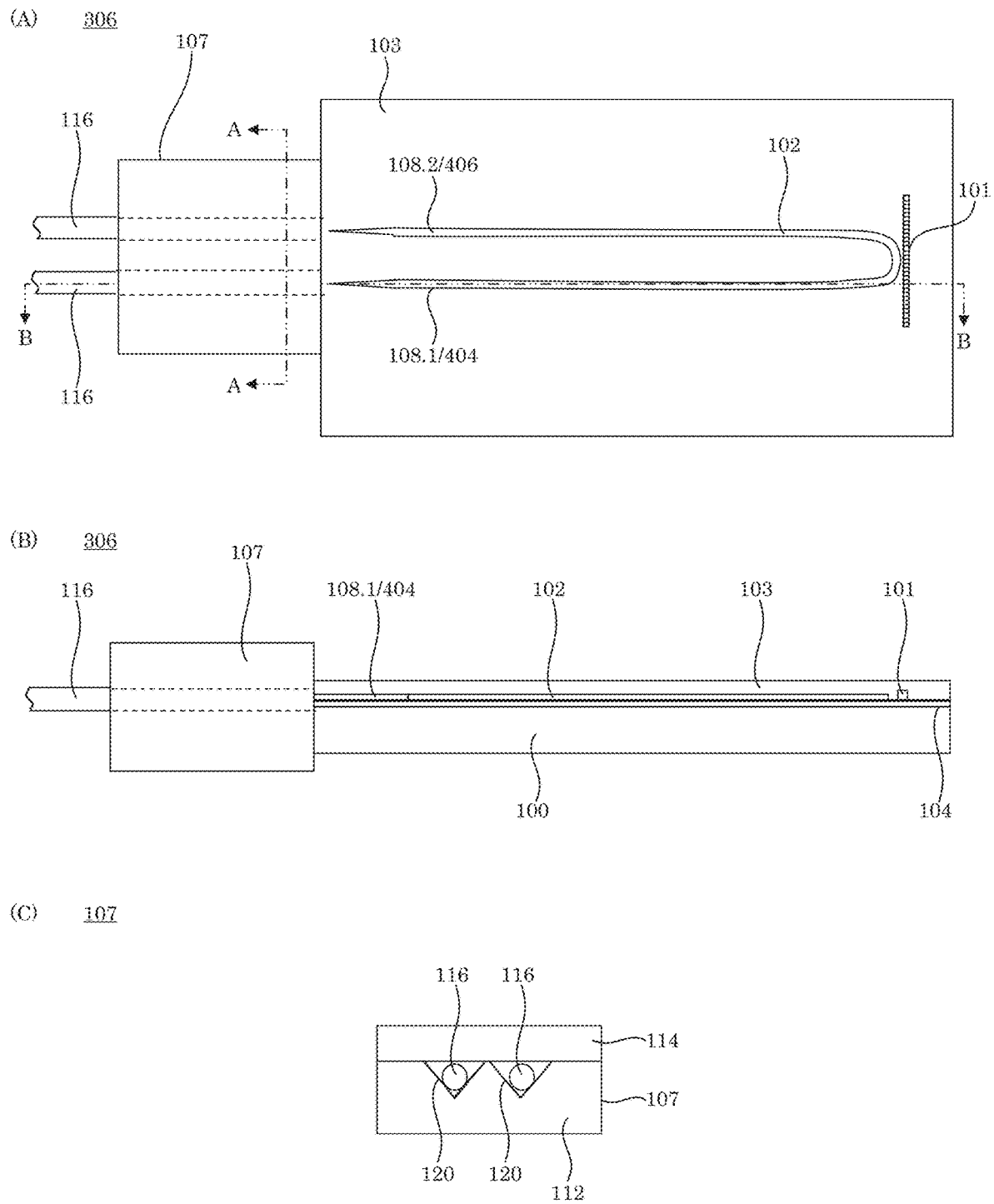
FIG. 14 shows a photonic thermometer in panel A; in panel B, a cross-section along line A-A shown in panel A; and, in panel C, a cross-section along line B-B shown in panel B.
Figure 15:
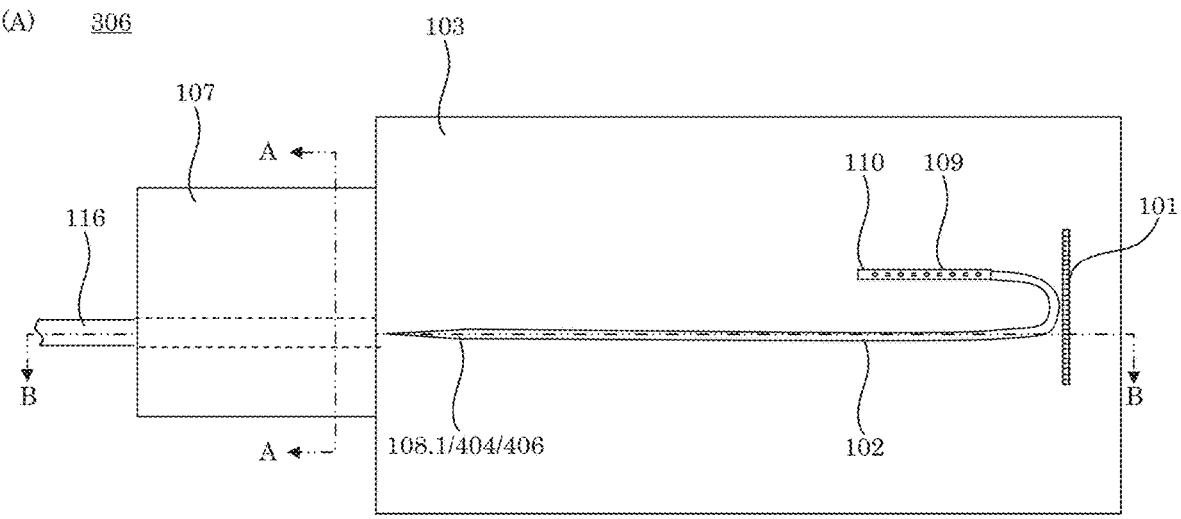
FIG. 15 shows a photonic thermometer in panel A; in panel B, a cross-section along line A-A shown in panel A; and, in panel C, a cross-section along line B-B shown in panel B.
Figure 15:
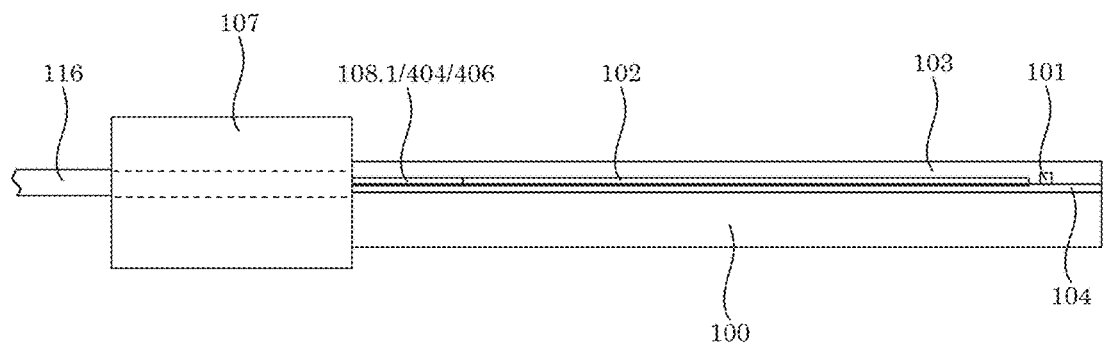
Figure 15:
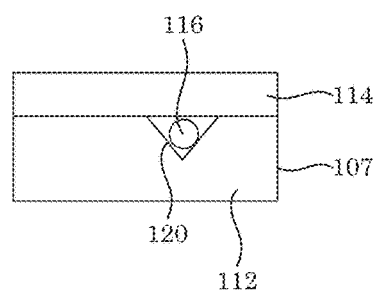

Inverse taper coupler 108 is disposed at the terminus of waveguide 102 as shown in FIGS. 14-15, panel A. Inverse taper can include a portion of the waveguide 102 where a width is tapered from a width of waveguide 102 to a minimum width at the terminus of inverse taper 108. In an embodiment, the inverse taper width at its terminus can be between 10 nm to 1 μm, specifically between 20 nm and 500 nm, and more specifically between 30 nm and 200 nm.

Photonic crystal cavity 101 receives primary light 408 and can include periodic or aperiodic perturbation of an effective index of refraction through photonic apertures 110 of different shape disposed therein. In some embodiments, a plurality of photonic apertures 110 is distributed along a length axis of a photonic crystal cavity 101. In certain embodiments, the plurality of photonic apertures 110 have a diameter of the same size. In an embodiment, some of the plurality of photonic apertures 110 have different size diameters. According to an embodiment, the plurality of photonic apertures 110 have different size diameters such that photonic apertures 110 are arranged symmetrically with respect to the center of photonic crystal cavity 101. In one embodiment, the largest diameter photonic aperture 110 located proximate to waveguide 402 and or to the center of photonic crystal cavity 101 and smallest diameter apertures 110 located distal to waveguide 402 and or to the center of photonic crystal cavity 101. In another embodiment, the smallest diameter aperture 110 is located proximate to waveguide 402 or to the center of photonic crystal cavity 101, and the largest diameter photonic aperture 110 is located distal to waveguide 402 or to the center of photonic crystal cavity 101. Exemplary photonic crystals cavity 101 include photonic apertures 110 circular in shape disposed therein. Another exemplary photonic crystal cavity 101 includes photonic apertures 110 elliptical in shape. Another exemplary photonic crystal cavity includes photonic aperture 110 that is square, triangular, or bow-tie shaped. In an embodiment, the size of photonic apertures can be from 20 nm to 3 μm, specifically from 50 nm to 1 μm, more specifically from 30 nm to 800 nm. The depth of apertures can be equal or less than the thickness of the waveguide. A size, i.e., a transverse cross-section dimension relative to a propagation path of primary light 408 in photonic crystal cavity 101, can be from 50 nm to 10 μm, specifically from 100 nm to 5 μm, and more specifically from 500 nm to 2.5 μm. In an embodiment, photonic crystal cavity 101 includes circular apertures of diameters ranging from 100 nm to 270 nm, aperture depth of 220 nm, and fixed aperture period of 335 nm. With regard to modulated Bragg mirror 434, sets 442 (e.g., 442.1, 442.2) of photonic aperture 110 includes minimum size (radius) aperture 440, maximum size (radius) aperture 442, and taper direction 444. Here, a minimum size (radius) aperture 440 is the smallest photonic aperture 110. In embodiment, minimum size aperture 440 is circular in shape, and the diameter of minimum size aperture 440 can be from 10 nm to 3 μm, specifically from 20 nm to 1 μm, more specifically from 30 nm to 800 nm. In embodiment, maximum size aperture 440 is circular in shape, and the diameter of maximum size aperture 440 can be from 10 nm to 3 μm, specifically from 20 nm to 1 μm, more specifically from 30 nm to 800 nm. In one embodiment, the taper direction 444 is the direction of decreasing size of photonic apertures 110 with the largest photonic apertures proximate to the center of photonic crystal cavity 101 and the smallest photonic apertures 110 distal from the center of the photonic crystal cavity 110. In another embodiment, the taper direction 444 is the direction of increasing the size of photonic apertures 110 with the smallest photonic apertures proximate to the center of photonic crystal cavity 101 and the largest photonic apertures 110 distal from the center of the photonic crystal cavity 110.

Optical fiber 116 can include a condensed matter medium that propagate light. Exemplary optical fiber 116 include single-mode, multi-mode, polarization-maintaining single-mode optical cable, and the like. Moreover, optical fiber 116 can propagate light in infrared, near-infrared, visible, and UV frequency ranges. In an embodiment, optical fiber 116 includes single-mode and polarization maintaining optical fiber propagating light in visible and infrared frequency ranges.

V-groove fiber array 107 interfaces with optical fiber 116 and couples light from optical fiber 116 into or out of photonic thermometer 306. In embodiment, with respect to FIGS. 10-15, panel C, V-groove fiber array 107 can include v-groove array substrate 112, periodic array of grove channels 120. Exemplary groove channel cross-section can include V- or U-share. In embodiment, the period of groove channels 120 can be between 30 μm and 500 μm, specifically between 50 μm and 400 μm, and more specifically between 60 μm and 250 μm. In an embodiment, optical fibers 116 are arranged in groove channels 120. In embodiment, the type of optical fibers can be single-mode, multi-mode, polarization maintaining fiber, and the like. Exemplary V-groove fiber array 107 includes V-groove array lid 114. In an embodiment, V-groove fiber array 107 includes materials such as borosilicate glass, fused quartz, Si, and the like.

Figure 20:
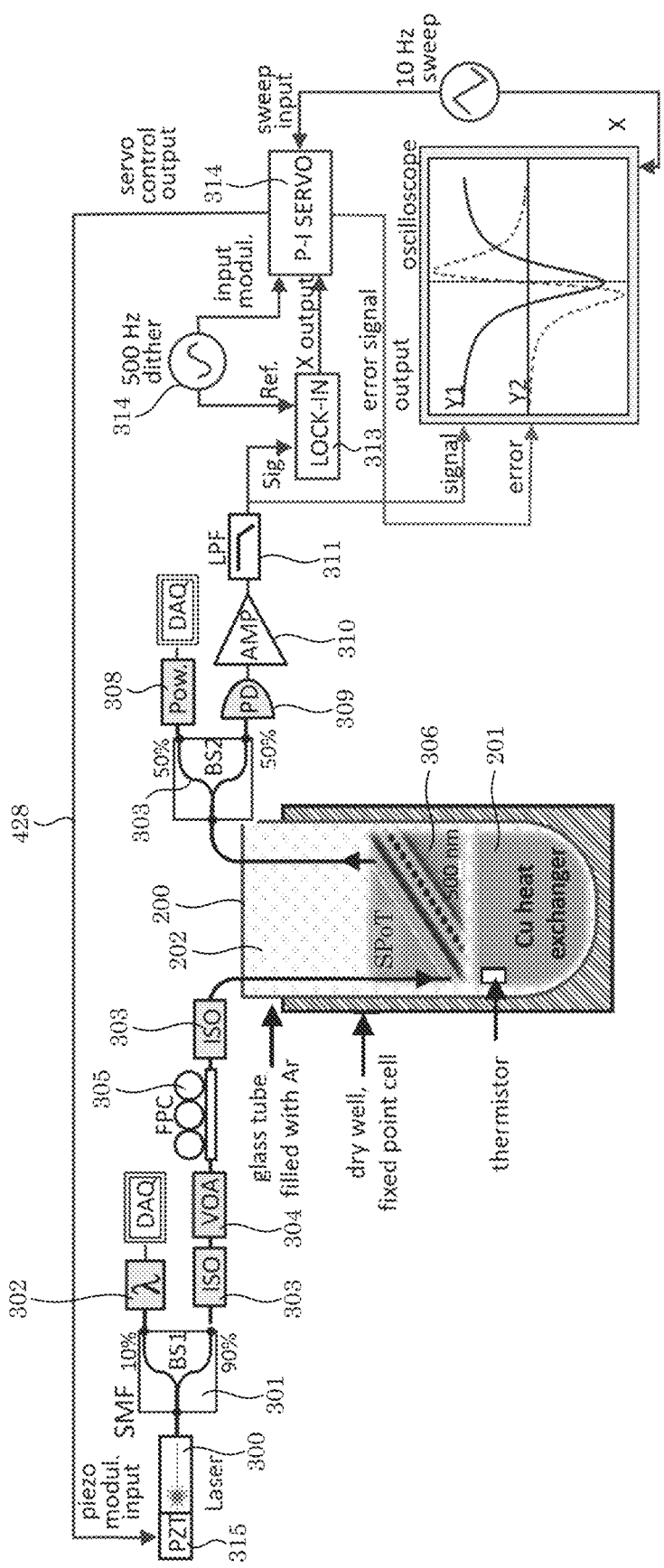
FIG. 20 shows a high-resolution photonic thermometer article.

In high-resolution photonic thermometer article 400, photonic thermometer 306 and various components, such as heat exchanger 201 can be disposed in tube 200 that has an inner volume. Tube 200 can include tube made of metal sheath, metal alloys sheath, borosilicate glass sheath, fused quartz sheath, and the like. Moreover, the length of the tube can be from 5 cm to 100 cm, specifically from 10 cm to 70 cm, and more specifically from 30 cm to 50 cm. The outer diameter of the tube can be from 2 mm to 15 mm, specifically from 4 mm to 10 mm, and more specifically from 3 mm to 8 mm. The wall thickness can be from 0.15 mm to 1.5 mm, specifically from 0.2 mm to 1 mm, and more specifically from 0.25 mm to 0.75 mm. In an embodiment, tube 200 includes fused quartz sheath and or Inconel sheath, of outer diameter between 7 mm and 12 mm, and wall thickness between 0.2 mm and 1 mm. Photonic thermometer 306 can be disposed on and in thermal contact with heat exchanger 201. Heat exchanger 201 can include solid material of high thermal conductivity, which serve as a media for thermal stabilization of photonic thermometer 306 and the external environment, with which the tube 200 is in contact. Exemplary heat exchanger 201 include a cylinder made of metals, ceramic, or other thermally conductive material. Examples of metal can be oxygen-free copper, aluminum, and the like. In an embodiment, heat exchanger 201 includes metal cylinder with thermal conductivity of heat exchanger 201 from 100 W m$^{-1}$ K$^{-1}$, to 1000 W m$^{-1}$ K$^{-1}$, specifically from 150 W m$^{-1}$ K$^{-1}$, to 700 W m$^{-1}$ K$^{-1}$, and more specifically from 200 W m$^{-1}$ K$^{-1}$, to 500 W m$^{-1}$ K$^{-1}$. The gap between heat exchanger 201 and the inner wall of tube 200 can be between 0.02 mm and 2 mm, specifically between 0.05 mm and 1 mm, and more specifically between 0.1 mm and 0.5 mm. Inert gas 202 can be disposed in tube 200. Inert gas 202 can include He, Ar, Ne, Xe, Kr, Rn, and the like. Moreover, the inert gas 202 acts as a heat conductive media between photonic thermometer 306, heat exchanger 201 and the tube 200. In an embodiment, inert gas 202 includes He, Ar, Ne, Xe, Kr, Rn, and the like. With reference to FIG. 20, tube 200 can be interconnected with other components of high-resolution photonic thermometer article 400 via optical fibers 116 to provide primary light 408 to photonic thermometer 306 and to receive thermometer light 420 from photonic thermometer 300.

Figure 30:
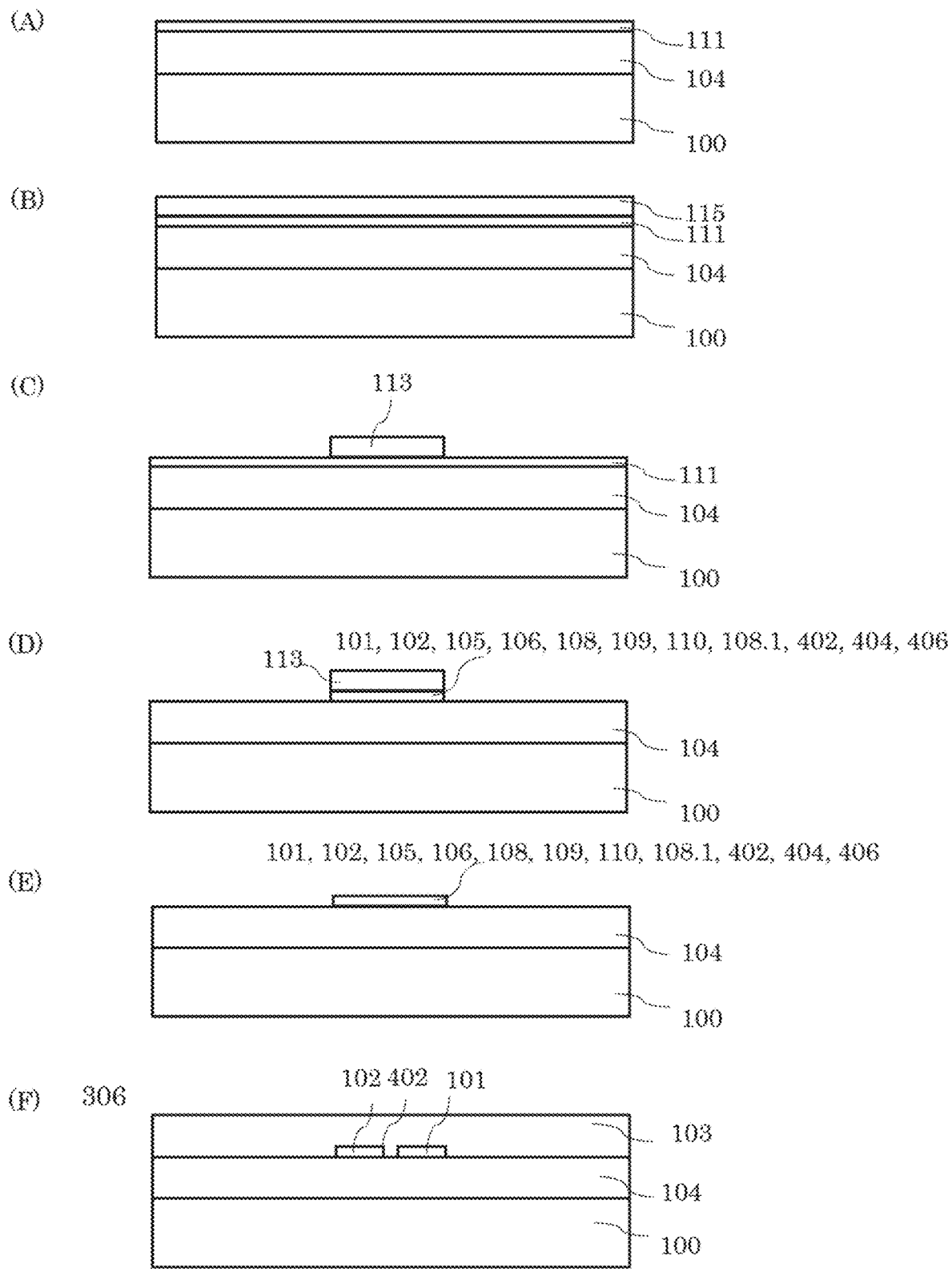
FIG. 30 shows fabrication steps in a process for making a high-resolution photonic thermometer article.

Photonic thermometer 306 can be made in various ways. In an embodiment, with reference to FIG. 30, a process for making photonic thermometer 306 includes: providing substrate 100 (e.g., a silicon-on-insulator, silicon nitride-on-insulator, lithium-niobate-on-insulator, and the like) that includes silicon; forming an buried oxide 104 on substrate 100 by thermal growth, chemical vapor deposition or plasma-enhanced chemical vapor deposition; forming device layer 111 (e.g., silicon, silicon nitride, aluminum nitride, lithium niobate and the like) on the buried oxide 104 by smart cut, wafer bonding, thin film deposition, epitaxial growth, as shown on panel A of FIG. 30. The process includes forming resist layer 115 on device layer 111 by spin-coating on device layer 111 as shown in panel B of FIG. 30. As shown in panel C of FIG. 30, resist mask 113 is made from resist layer 115 by lithography (e.g., photolithography, electron beam lithography, nanoimprint lithography). As shown in panel D of FIG. 30, a portion of device layer 112 that is unprotected by resist mask 113 is etched, and a selected portion of device layer 112 forms elements of photonic thermometer 306 (e.g. 101, 102, 105, 106, 108, 109, 110, 108.1, 402, 404, 406, and the like) is protected by resist mask 113. As shown in panel E of FIG. 30, resist mask 113 is dissolved in a solvent to expose elements of photonic thermometer 306 (e.g. 101, 102, 105, 106, 108, 109, 110, 108.1, 402, 404, 406, and the like). As shown in panel F of FIG. 30, a top-cladded oxide 103 is formed by depositing an insulating layer such as silicon dioxide on top of elements of photonic thermometer 306 (e.g. 101, 102, 105, 106, 108, 109, 110, 108.1, 402, 404, 406, and the like) by chemical vapor deposition or plasma-enhanced chemical vapor deposition, atomic layer deposition.

In an embodiment, a process for making photonic thermometer 306 includes multi-step high-temperature annealing of photonic thermometer 306 after deposition of top-cladded oxide 103. In embodiment, annealing can be performed in inert gas environment, or in vacuum at temperatures between 400° C. and 1000° C., specifically between 500° C. and 1000° C., more specifically between 700° C. and 950° C. Annealing length can be between 20 min and 120 min, specifically between 30 min and 90 min, and more specifically between 45 min and 90 min. The number of annealing cycles can be between 1 and 20, specifically between 3 and 15, and more specifically between 5 and 10. This procedure densifies top-cladded oxide 103, make it less penetrable to water vapors, and increase photonic thermometer stability and reproducibility.

In an embodiment, a process for making photonic thermometer 306 also includes attachment of v-groove fiber array 107 to input/output light coupling ports 404/406. In embodiment, the attachment can be done using UV curable polymeric adhesives, thermally curable adhesive, ceramic adhesive, SOL-Gel adhesives, and the like. In embodiment, V-groove fiber arrays can be attached to input/out light coupling ports 404/406 using laser-assisted fusion, using CO2 laser, fs-pulse lasers and the like. In embodiment, V-groove fiber arrays can be attached to input/out light coupling ports 404/406 using KOH bonding, anodic bonding, metal compression, and the like.

Moreover, the high-resolution photonic thermometer article can include optical fiber coupling and chip-packaging that overcome conventional long-term drift of a resonant frequency of the photonic crystal cavity. In embodiment, with respect to FIGS. 10-15, the photonic thermometer features a long bus waveguide 102. In embodiment, the length of bus waveguide 102 can be between 1 mm and 20 mm, specifically between 2 mm and 10 mm, and more specifically between 3 mm and 8 mm. Long bus waveguide 102 allow to spatially separate photonic crystal cavity 101 from input light coupler 404 and out light coupler 406. Long bus waveguide 102 assures that the attachment v-groove fiber array to the input/out light coupling port 404/406 is not in the adjacent proximity to the photonic crystal cavity 101.

Figure 22:
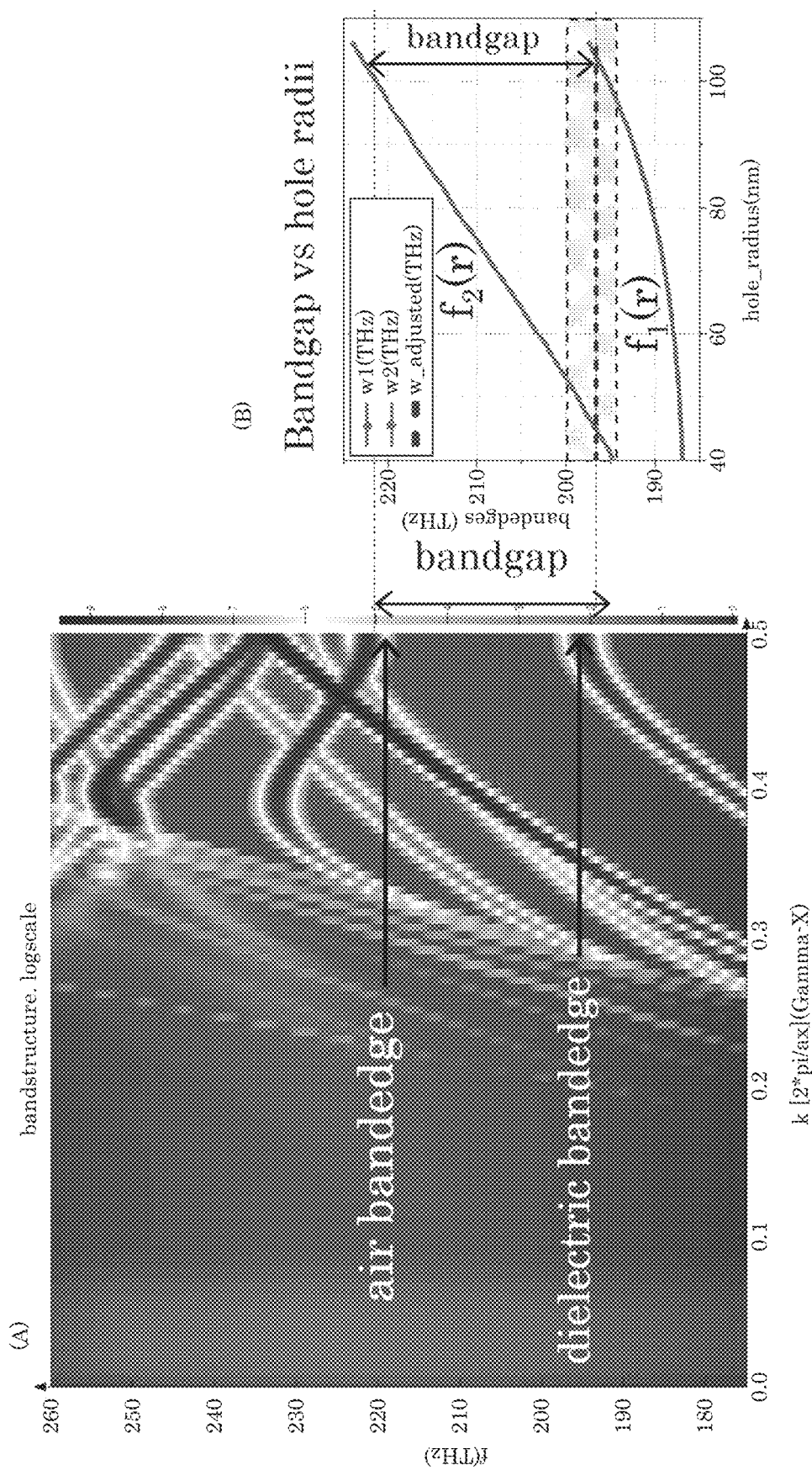
FIG. 22 shows a graph of frequency versus kappa in panel A and a graph of band edge frequency versus aperture radius in panel B.
Figure 23:
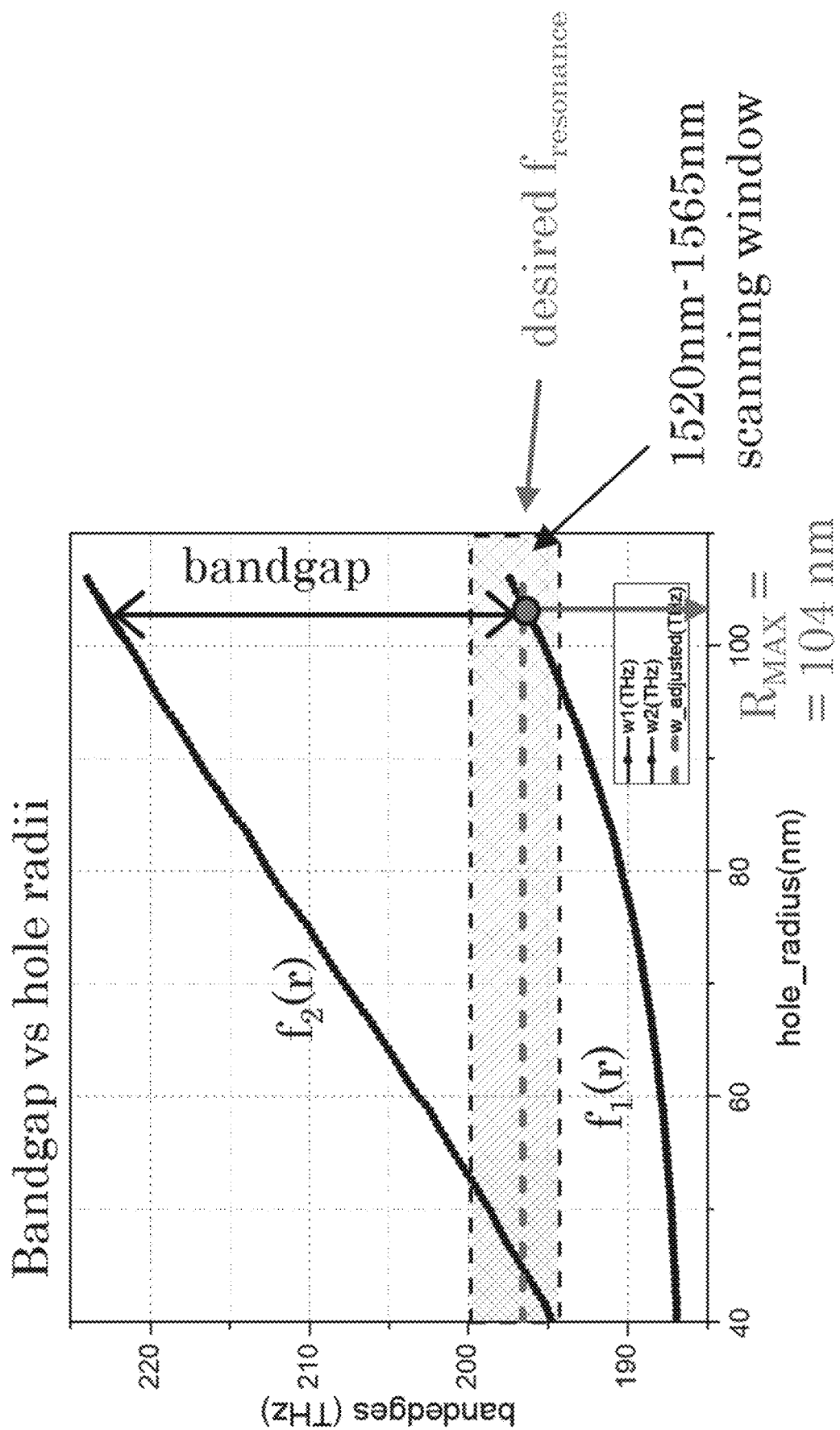
FIG. 23 shows a graph of band edge frequency versus aperture radius.
Figure 24:
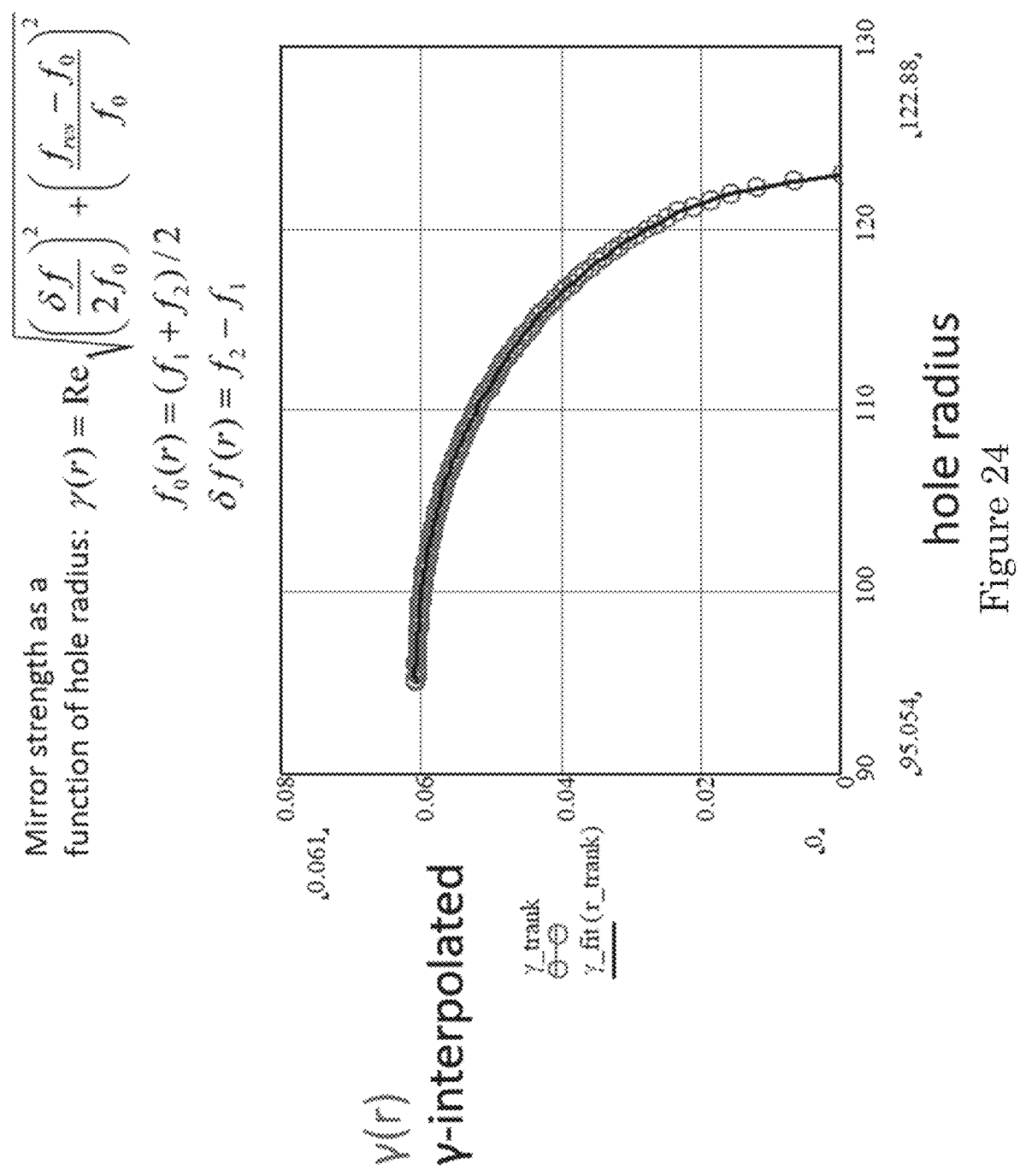
FIG. 24 shows a graph of photonic mirror strength G versus aperture radius.

High-resolution photonic thermometer article 500 can be made in various ways. In an embodiment, with reference to FIG. 21, a process for making high-resolution photonic thermometer article 500 includes: forming the waveguide 402 on the substrate 100 by calculating waveguide cross-section dimensions (using mode solver or finite-element method analysis) that allow propagation of single mode (TE or TM) in the waveguide 402 (step 502); determining a photonic band structure of one-dimensional photonic crystal formed by a periodic array of fixed radius photonic apertures 110 in a nanobeam waveguide (step 504). An exemplary band structure and a band gap between air band edge and dielectric band edge of photonic crystal with fixed radii apertures 110 is shown on panel A of a FIG. 22. In an embodiment, with reference to FIG. 21, a process for making high-resolution photonic thermometer article 500 also includes determining a photonic band gap between dielectric band edge function $f1(r)$ and air band edge function $f2(r)$ for photonic crystal cavity 101 as a function of the size (e.g. radii), r, of the photonic apertures 110 (step 504) by calculating photonic nanobeam crystal band structure for various sizes (e.g. radii) of photonic apertures 110 and determining the bandgap for varied radii of photonic apertures 110 (see FIGS. 22, 23); selecting targeted resonance frequency $f_{res}$ of photonic crystal cavity 101 (see FIG. 23) that is within the desired frequency range (e.g. infrared, visible, UV) (step 506); for a given $f_{res}$ calculating mirror strength for mirror element formed by photonic aperture and nanobeam waveguide (step 508) (see FIG. 24):

$$G(r) = \text{Re}\sqrt{\left(\frac{f2-f1}{2f0}\right)^2 - \left(\frac{fres-f0}{f0}\right)^2}, \text{ where } f0 = (f2+f1)/2$$

Figure 21:
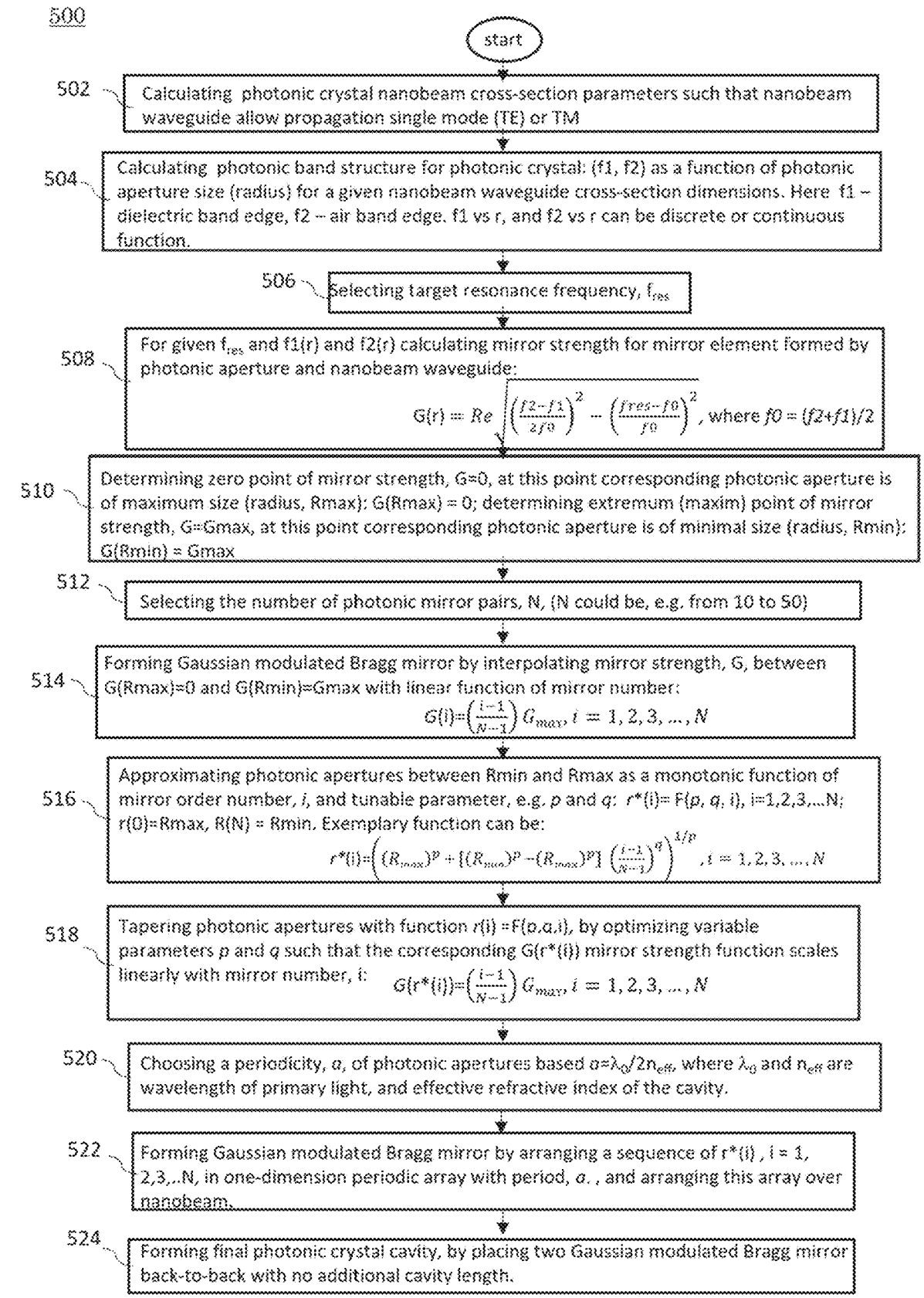
FIG. 21 shows a flow chart for making tapered photonic crystal cavities for a photonic thermometer.
Figure 25:
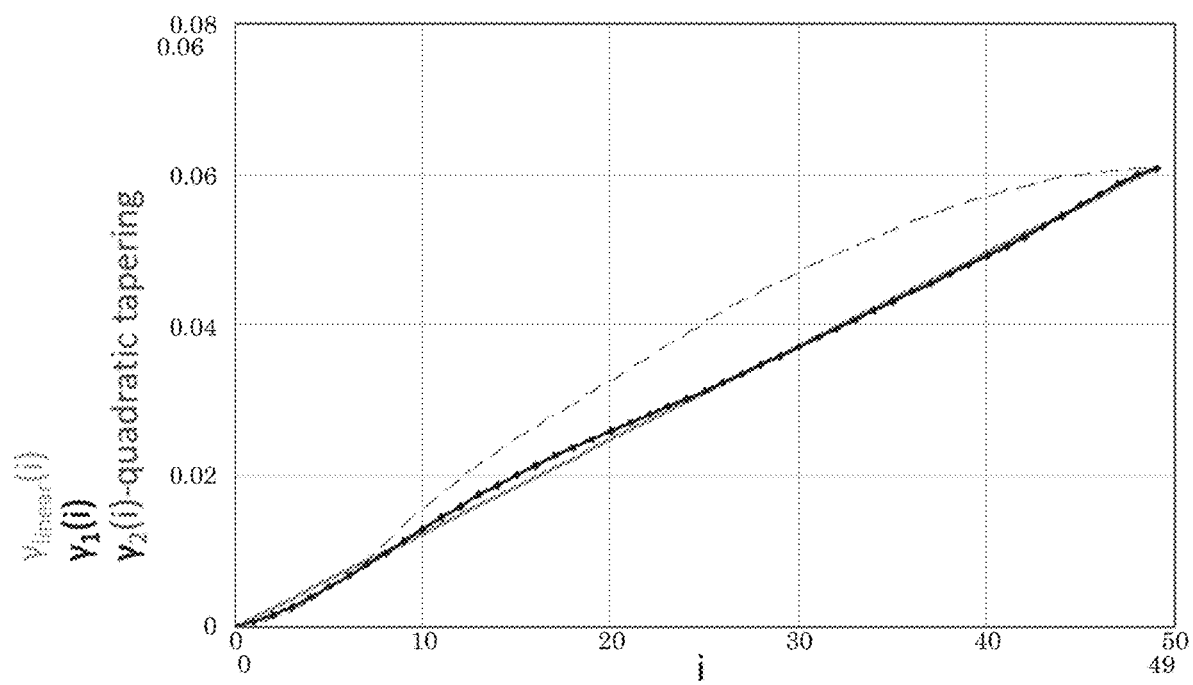
FIG. 25 shows a graph of photonic mirror strength G versus number N of pairs of photonic apertures.

In an embodiment, with reference to FIG. 21, a process for making high-resolution photonic thermometer article 500 also includes determining zero point of mirror strength, G=0, at this point corresponding photonic aperture is of maximum size (radius, Rmax): $G(R_{max})=0$; determining extremum (maxim) point of mirror strength, $G=G_{max}$, at this point corresponding photonic aperture is of minimal size (radius, $R_{min}$): $G(R_{min})=G_{max}$ (step 510); Selecting the number of photonic mirror pairs, N, (N could be, e.g. from 10 to 50); forming Gaussian modulated Bragg mirror by interpolating mirror strength, G, between $G(R_{max})=0$ and $G(R_{min})=G_{max}$ with linear function of mirror number (step 514) (see FIG. 25):

$$G(i) = \left(\frac{i-1}{N-1}\right)G_{max}, i = 1, 2, 3, \ldots, N$$

In an embodiment, with reference to FIG. 21, a process for making high-resolution photonic thermometer article 500 also includes approximating photonic apertures between $R_{min}$ and $R_{max}$ as a monotonic function of mirror order number, i, and tunable parameter, e.g. p and q: $r^*(i)=F(p, q, i)$, i=1, 2, 3, . . . N; $r(0)=R_{max}$, $R(N)=R_{min}$ (step 516). Exemplary function can be:

$$r^*(i) = \left((R_{max})^p + [(R_{min})^p - (R_{max})^p]\left(\frac{i-1}{N-1}\right)^q\right)^{1/p}, i = 1, 2, 3, \ldots, N$$

In an embodiment, with reference to FIG. 21, a process for making high-resolution photonic thermometer article 500 also includes tapering photonic apertures with function $r(i)=F(p,q,i)$, by optimizing variable parameters p and q such that the corresponding $G(r^*(i))$ mirror strength function scales linearly with mirror number, i (step 518) (see FIG. 25):

$$G(r^*(i)) = \left(\frac{i-1}{N-1}\right)G_{max}, i = 1, 2, 3, \ldots, N$$

In an embodiment, with reference to FIG. 21, a process for making high-resolution photonic thermometer article 500 also includes choosing a periodicity, a, of photonic apertures 110 based $a=\lambda_0/2n_{eff}$, where $\lambda_0$ and $n_{eff}$ are wavelength on primary light 408, and effective refractive index of the cavity (518); forming Gaussian modulated Bragg mirror by arranging a sequence of $r^*(i)$, i=1, 2, 3, . . . , N, in one-dimension periodic array with period, α, and arranging this array over nanobeam (step 522); forming final photonic crystal cavity, by placing two Gaussian modulated Bragg mirror back-to-back with no additional cavity length (step 524).

High-resolution photonic thermometer article 400 has numerous advantageous and unexpected benefits and uses. In an embodiment, a process for performing high-resolution photonic thermometry with high-resolution photonic thermometer article 400 includes: receiving, by light source 300, control signal 428; producing, by light source 300, primary light 408 based on control signal 428; receiving, by input light coupler 404 of photonic thermometer 306, primary light 408 by connecting primary light 408 to input light coupler 404 via free-space optics or fiber-optics light coupling; communicating primary light 408 to photonic crystal cavity 101 via a waveguide 402; receiving, by photonic crystal cavity 101, primary light 408 from waveguide 402 via direct coupling of primary light 408 from waveguide 402 to photonic crystal cavity 101, or via evanescent coupling of primary light 408 to photonic crystal cavity 101; storing, by photonic crystal cavity 101, primary light 408 when primary light 408 matches resonance frequency 412 of photonic crystal cavity 101 by absorbing by photonic crystal cavity 101 a fraction of primary light 408, absorption power 416; receiving, by output light coupler 406, primary light 408 as thermometer light 420 after primary light 408 has interacted with photonic crystal cavity 101 by coupling thermometer light 420 to waveguide 402 via direct coupling or via evanescent coupling; communicating thermometer light 420 from photonic thermometer 306 to output light coupler 406 via free-space optics or fiber-optics light coupling; receiving, by photodetector 309, thermometer light 420 from photonic thermometer 306 by free-scape coupling or fiber-optics light coupling of thermometer light 420; producing, by photodetector 309, photodetector signal 422 from thermometer light 420 by communicating thermometer light 420 to photodetector 309 sensing element; receiving, by phase sensitive detector 313, photodetector signal 422 from photodetector 309; receiving, by phase sensitive detector 313, reference frequency signal 424; producing, by phase sensitive detector 313, lock signal 426 from photodetector signal 422, based on reference frequency signal 424, by mixing photodetector signal 422 and reference frequency signal 424; producing, by local oscillator 312, reference frequency signal 424 by communicating local oscillator 312 output signal using RF cable; receiving, by servo controller 314, lock signal 426 from phase sensitive detector 313 and reference frequency signal 424 from local oscillator 312; producing, by servo controller 314, control signal 428 from lock signal 426 and reference frequency signal 424 PID feedback controller module of the servo controller 314; and controlling, by control signal 428, primary wavelength 410 of primary light 408 produced by light source 300 by communicating control signal 428 to transducer 315 to maximize absorption power 416 in photonic thermometer 306 by adjusting the wavelength of light source by transduction control signal 430 generated by transducer 315. It should be appreciated that this process provided high-resolution photonic thermometry because the frequency of light source 300 is automatically adjusted using control signal to maximize absorption power 416 in optical thermometer 306, and to match the narrow line resonance of photonic thermometer 306. The process can automatically adjust the frequency of light 300 to match the resonance frequency of the photonic thermometer 306. For high-quality photonic crystal cavity 101 with narrow line resonance, such matching of frequencies can be accomplished with low uncertainty. The frequency of primary light is determined using frequency metrology.

The process for performing high-resolution photonic thermometry further can include producing, by local oscillator 312, reference frequency signal 424; receiving, by electro-optic phase modulator 318, primary light 408 and reference frequency signal 424; phase modulating, by electro-optic phase modulator 318, primary light 408 based on reference frequency signal 424; receiving, by mixer 322, photodetector signal 422 and reference frequency signal 424, wherein phase sensitive detector 313 includes mixer 322; producing, by mixer 322, lock signal 426, wherein lock signal 426 is filtered by filter 311; communicating lock signal 426 to servo controller 314; producing control signal 428 by servo controller 314; communicating control signal 428 to transducer 315; maximizing absorption power 416 in photonic thermometer 306 by adjusting the wavelength of light source by transduction control signal 430 generated by transducer 315.

The process for performing high-resolution photonic thermometry can include receiving, by optical circulator 324 interposed between light source 300 and photonic thermometer 306 and between photonic thermometer 306 and photodetector 309, primary light 408 from the light source 300; converting, by photonic thermometer 306, primary light 408 to thermometer light 420; and receiving, by optical circulator 324, thermometer light 420 from photonic thermometer 306.

The process for performing high-resolution photonic thermometry can include determining a temperature of photonic thermometer 306 from primary wavelength 410 controlled by control signal 428. This includes splitting primary light 408 using splitter 301, where the first portion of primary light 408 is communicated to photonic thermometer 306, and the second portion of primary light 408 is communicated to wavelength monitor 302, wherein wavelength monitor 302 measures a wavelength or frequency of primary light and hence, the wavelength/resonance of photonic thermometer at a given temperature.

The process for performing high-resolution photonic thermometry also can include determining the self-heating characteristic of photonic thermometer 306 induced by resonance absorption of primary light 408 at various light powers. The measurement of the dependence of self-heating at various absorption powers 416 can be done by thermally equilibrating photonic thermometer 306 within a very stable environment such as a fixed-point cell realized at a phase transition temperature and measuring resonant wavelengths of a photonic thermometer at varied powers of primary light 408.

The process for performing high-resolution photonic thermometry also can include calibrating the photonic thermometer at various temperatures provided by an ultra-stable environment such as phase transition temperatures realized in a fixed-point cell. According to an embodiment, photonic thermometer 306 is subjected to temperature-wavelength calibration to a response (e.g., a wavelength shift) determined at a plurality of temperatures set by various fixed-point phase transition temperatures. A measured calibration (resonant wavelength-temperature dependence) can adjusted by extrapolating the resonant wavelength to zero power of primary light 408 using self-heating dependence of photonic thermometer 306. A mathematical function (e.g., a polynomial) is fit to calibration data to create a conversion for a measure resonant wavelength (or wavelength shift) to temperature.

High-resolution photonic thermometer article 400 and processes disclosed herein have numerous beneficial uses, including ultra-high temperature resolution, stability, and reproducibility. Photonic thermometer article 400 leverages frequency metrology and can detect a temperature with sub-10 µK resolution. The photonic thermometer has low noise and low thermal mass. Moreover, the photonic thermometer substantially is unaffected by electromagnetic interference. Advantageously, high-resolution photonic thermometer article 400 overcomes limitations of technical deficiencies of conventional articles. Conventional ultra-high-resolution thermometry is achieved with Standard Platinum Resistance Thermometers (SPRTs). Ultrahigh-resolution photonic thermometer with µK-level temperature resolution may replace the resistance-based thermometry and how a temperature standard or reference is disseminated. High quality factor photonic sensors, when coupled with laser locking techniques, have resolution and repeatability that is on par or better than SPRTs. They can outperform SPRTs in (i) resolution, (ii) repeatability/hysteresis, (iv) operation speed, (v) size of the sensor, (vi) reliability. Exemplary areas of application include medicine, aerospace, analytic instrumentation, advanced manufacturing, food and beverage process control, semiconductor industry, and the like.

Additionally, while SPRTs are sensitive to mechanical shock, the photonic thermometer herein has a response that is substantially independent of mechanical shock.

Moreover, the performance of photonic thermometer does not vary over a wide range of relative humidity levels, e.g., a relative humidity greater than 17 percent relative humidity (% RH), and more specifically 26% RH, based on the amount of water vapor in a gas surrounding the photonic thermometer.

Furthermore, high-resolution photonic thermometer article 400 overcomes problems with conventional temperature metrology. In an aspect, photonic thermometer provides real-time data acquisition with microsecond time resolution.

In addition, photonic thermometer, unexpectedly can withstand high radiation doses, and thus can operate in harsh radiation environment.

Moreover, high-resolution photonic thermometer article 400 and processes herein have numerous advantageous properties. In an aspect, due to its calibration, in contrast to SPRT, photonic thermometer 400 is substantially unaffected by mechanical shock or thermal stress to provide ultrahigh-resolution thermometry to be readily deployable to industry. The photonic thermometer can provide field-deployable temperature measurement that can operate stably in presence of a perturbating vibration and can be disposed on a plurality of actively vibrating articles, e.g., airplanes, satellites, automobiles, and the like. Furthermore, the photonic thermometer can be a temperature standard for dissemination of the International Temperature Scale of 1990 (ITS-90) to calibration laboratories and as a transfer standard for international measurement comparisons between national metrology institutes.

High-resolution photonic thermometer article 400 and processes herein unexpectedly can be inexpensively manufactured compared to other conventional thermometers. Moreover, high-resolution photonic thermometer article 400 has a small size, on the order of few micrometers, what. Furthermore, the small size of photonic thermometer provides implementation in an embedded temperature sensor array network and achievement of spatial temperature resolution on a length scale ranging from few meters to a few micrometers.

The articles and processes herein are illustrated further by the following Example, which is non-limiting.

EXAMPLE

Photonic crystal cavity temperature nanosensor with µK-level temperature resolution.

Photonic thermometry refers to the use of light-matter interaction in guided media to probe temperature induced changes in the refractive index. Changes in refractive index transduce large change in device resonance frequency that can be read out using frequency metrology techniques.

Figure 6:
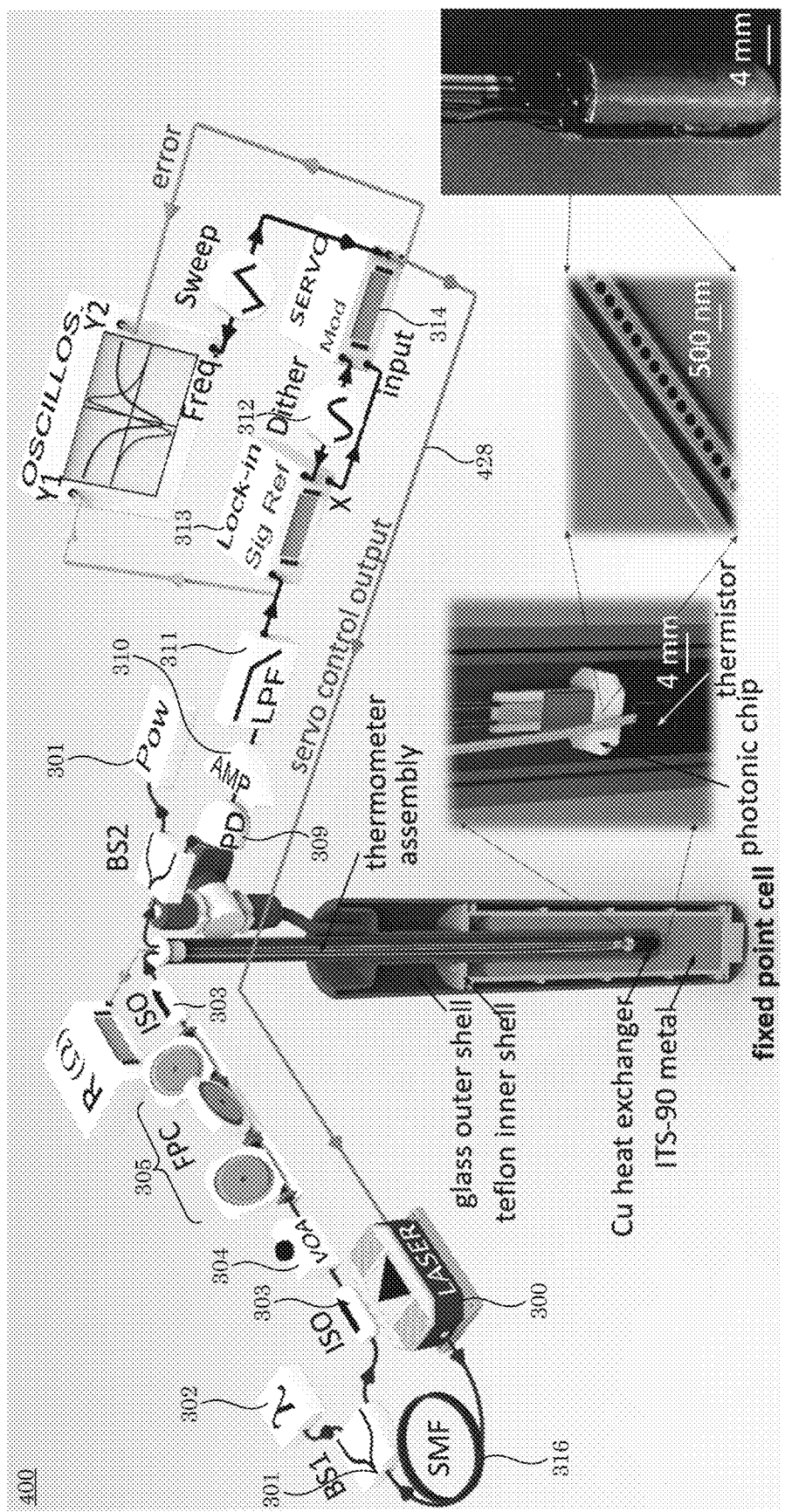
FIG. 6 shows a high-resolution photonic thermometer article.
Figure 7:
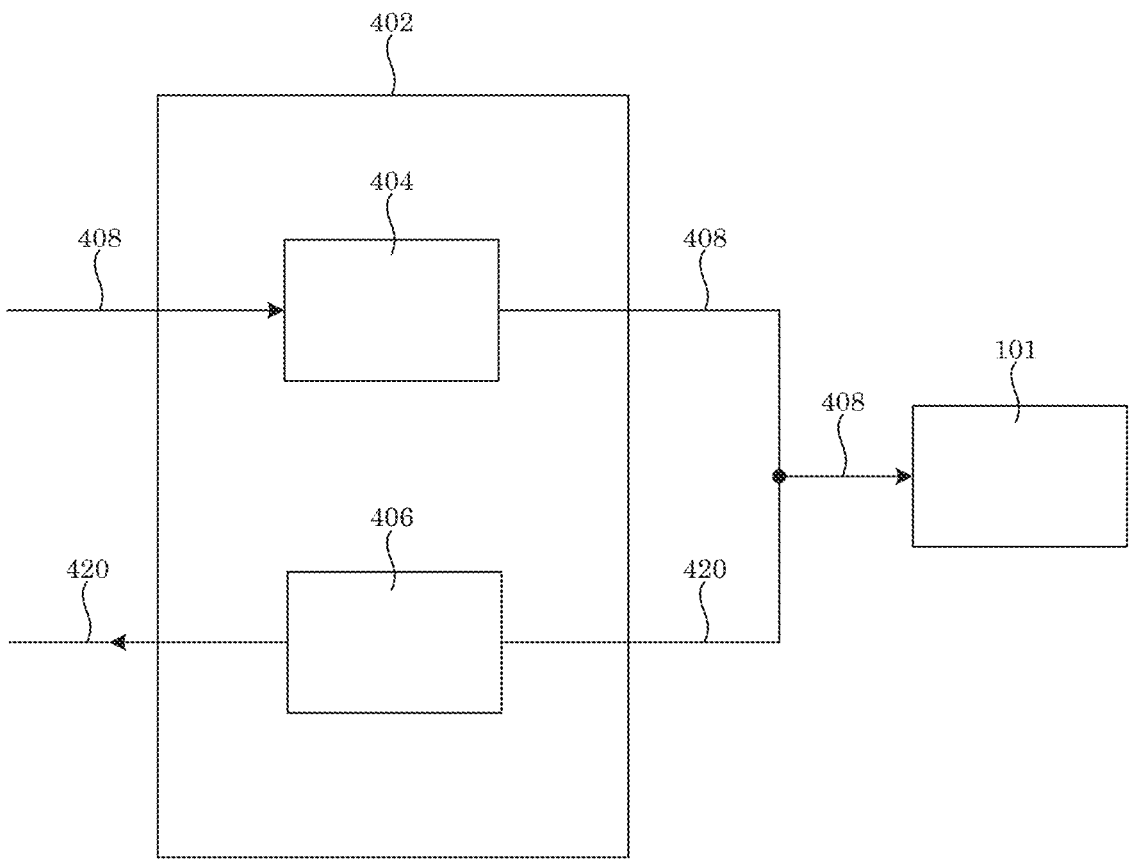
FIG. 7 shows a photonic thermometer.
Figure 26:
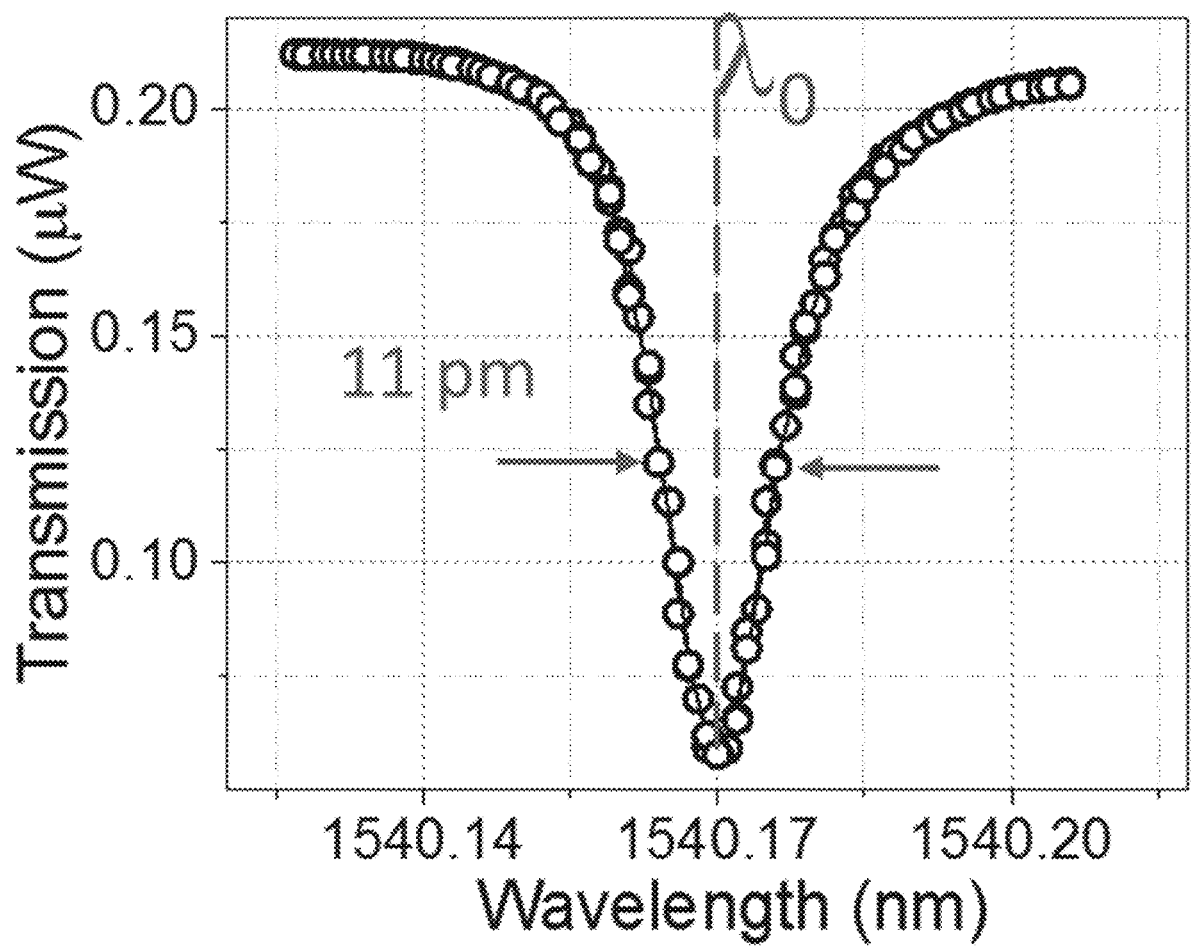
FIG. 26 shows a graph of transmission versus wavelength.
Figure 27:
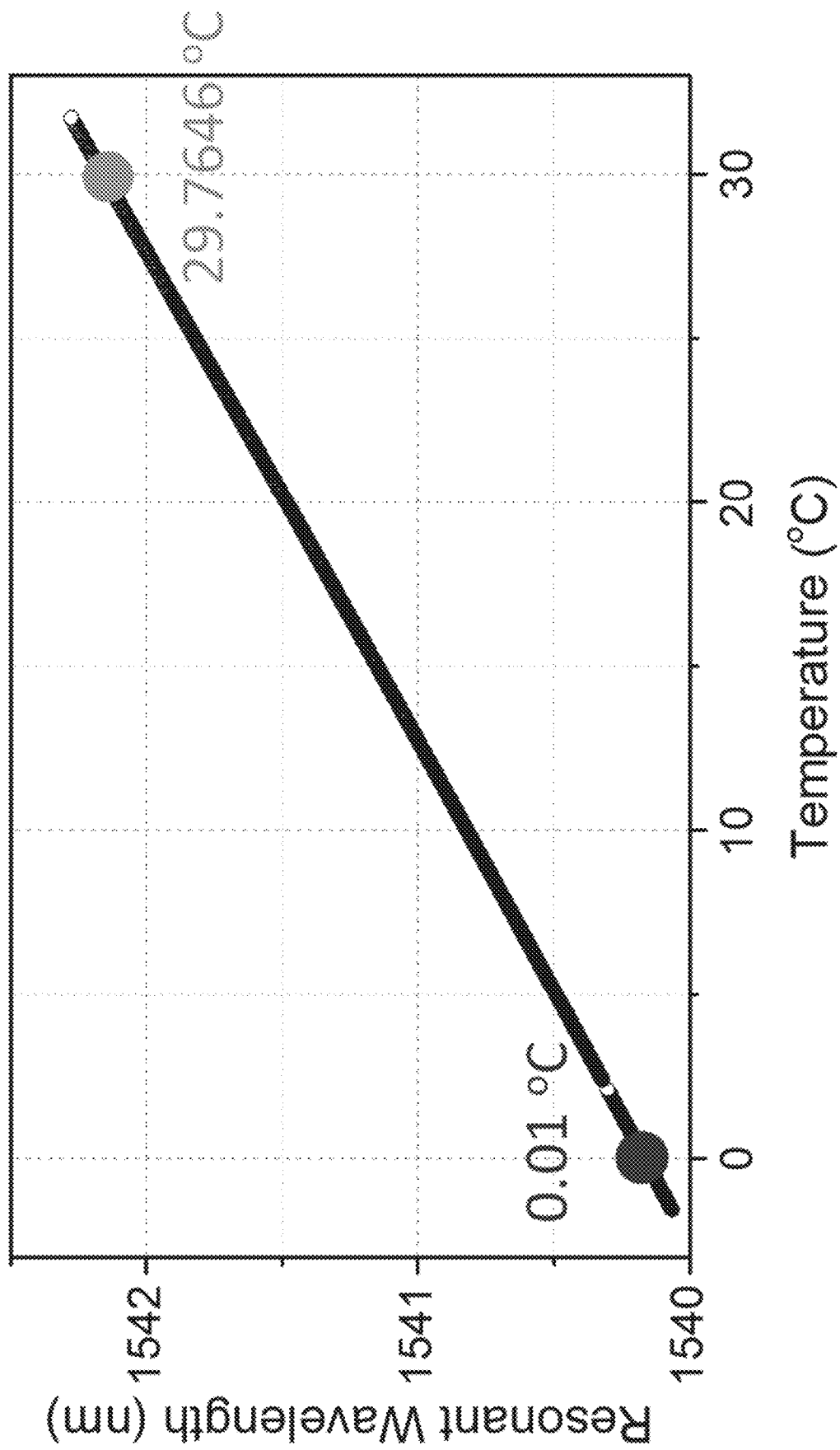
FIG. 27 shows a graph of resonanct wavelength versus temperature.

A temperature measurement is achieved by sweeping the laser to locate the resonant mode, such as shown in FIG. 26, for a photonic crystal cavity or other similar SOI technology. The high-Q device provides high resolution (and accuracy) thermometry. The center frequency of the resonant mode shifts due to temperature changes. FIG. 27 shows a graph of resonant wavelength versus temperature for frequency shift due to temperature change and indicates calibration. To achieve precise measurement of frequency shift, a laser stabilization servo locks the frequency output of the laser to a resonant mode of the photonic sensor, translating a temperature change into a frequency measurement. FIG. 6 shows a configuration of lasers and fiber coupled photonic thermometer 306.

A dither lock was performed, and it is contemplated that other laser stabilization can be employed, e.g., Pound-Drever-Hall, and the like. The dither lock was made by modulating the wavelength of the laser via the piezoelectric transducer (PZT), sending the modulated light into the sensor then detecting either the transmitted or reflected light with a sensitive detector and demodulating the signal with a lock-in amplifier. The lock-in generates the error signal which is sent to the servo controller. The servo controller has a proportional and integral gain and servos back to the PZT of the laser to maintain laser lock. Ten percent of the laser output was sampled with a wavelength meter and the remaining portion of the light was sent into the sensor system. The wave meter measured the frequency precisely and accurately but can heterodyne with a stabilized laser with measurement of the beat frequency with a high-speed counter can be used.

Figure 28:
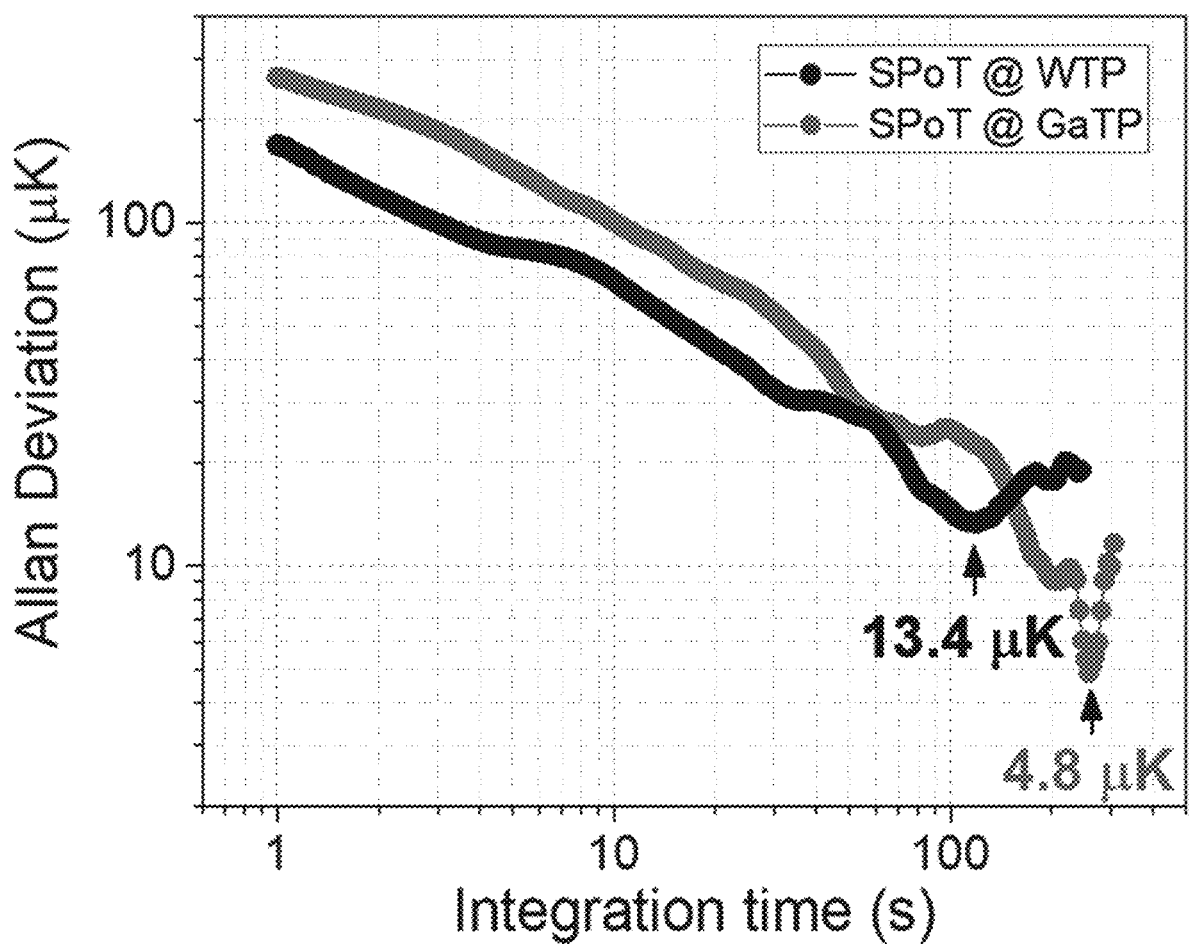
FIG. 28 shows a graph of Allan deviation versus integration time.
Figure 29:
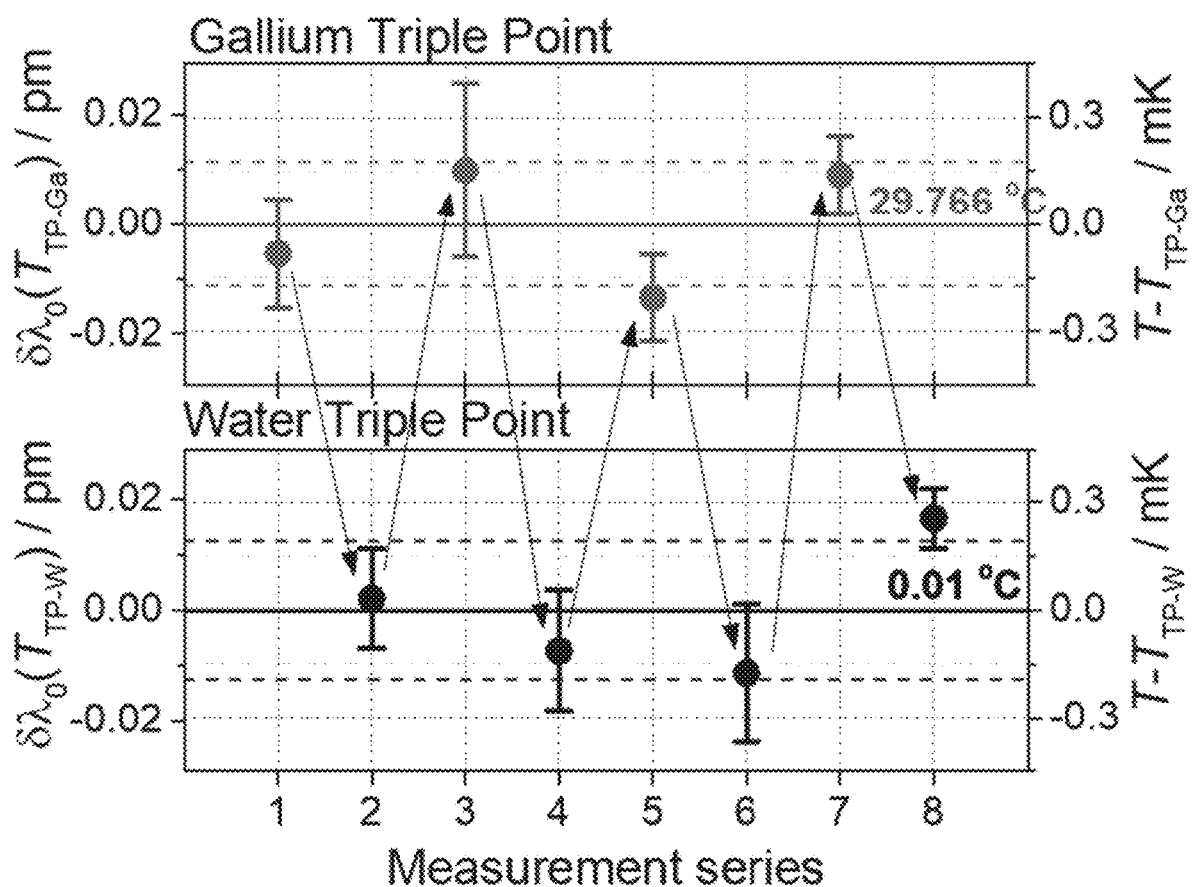
FIG. 29 shows graphs of change in a triple point of water and gallium versus measurement series.

The packaged photonic thermometer was tested for in a triple point of water cell and triple point of Gallium cell. Performance was compared to standard calibrated resistance thermometers with results shown in FIG. 28 and FIG. 29.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A high-resolution photonic thermometer article for performing high-resolution thermometry, the high-resolution photonic thermometer article comprising:
   a light source that:
      receives a control signal; and
      produces, based on the control signal, a primary light that comprises a primary wavelength and a primary power;

a photonic thermometer in communication with the light source and comprising:
  a waveguide in communication with a photonic crystal cavity and comprising:
    an input light coupler that receives the primary light;
    the photonic crystal cavity in communication with the input light coupler and that:
      interacts with the primary light from the input light coupler; and
      stores the primary light when the primary wavelength matches a resonance frequency of the photonic crystal cavity, such that an amount of primary light stored in the photonic crystal cavity comprises an absorption power; and
    the waveguide further comprising an output light coupler in communication with the photonic crystal cavity and that:
      receives the primary light as thermometer light after the primary light has interacted with the photonic crystal cavity, the thermometer light comprising a transmission power that is indirectly proportional to the absorption power of the primary light stored in the photonic crystal cavity;
  a photodetector in communication with the photonic thermometer and that:
    receives the thermometer light from the photonic thermometer; and
    produces a photodetector signal from the thermometer light;
  a phase sensitive detector in communication with the photodetector and that:
    receives the photodetector signal from the photodetector;
    receives a reference frequency signal; and
    produces a lock signal from the photodetector signal, based on the reference frequency signal;
  a local oscillator in communication with the phase sensitive detector and that produces the reference frequency signal; and
  a servo controller in communication with the phase sensitive detector and the local oscillator and that:
    receives the lock signal from the phase sensitive detector;
    receives the reference frequency signal from the local oscillator; and
    produces the control signal from the lock signal and the reference frequency signal such that the absorption power is maximized through wavelength control of the light source by the control signal.

2. The high-resolution photonic thermometer article of claim 1, wherein the photonic thermometer further comprises a substrate on which the input light coupler and photonic crystal cavity are disposed.

3. The high-resolution photonic thermometer article of claim 2, further comprising a V-groove fiber array disposed on the substrate and comprising a first optical fiber in communication with the input light coupler and that provides the primary light to the input light coupler; and
  a second optical fiber in communication with the output light coupler and that receives the thermometer light from the output light coupler.

4. The high-resolution photonic thermometer article of claim 1, further comprising a transducer electrically interposed between and in communication with the light source and the servo controller and that:
  receives the control signal from the servo controller;
  produces a transduction control signal based on the control signal; and
  communicates the transduction control signal to the light source to control production of the primary wavelength by the light source.

5. The high-resolution photonic thermometer article of claim 1, further comprising a wavelength meter in communication with the light source and that receives the primary light from the light source and determines a wavelength of the primary wavelength.

6. The high-resolution photonic thermometer article of claim 1, further comprising an isolator, an optical attenuator, a polarization controller, or a combination of at least one of the foregoing optical elements in communication with the light source and that receives the primary light and varies a property of the primary light.

7. The high-resolution photonic thermometer article of claim 1, further comprising an optical power meter in communication with the photonic thermometer and that receives the thermometer light from the photonic thermometer and determines the transmission power.

8. The high-resolution photonic thermometer article of claim 1, wherein the waveguide comprises a bus waveguide separated from the photonic crystal cavity by a distance that provides for evanescent coupling between the bus waveguide and the photonic crystal cavity.

9. The high-resolution photonic thermometer article of claim 1, wherein the waveguide comprises a direct-couple waveguide in which the photonic crystal cavity is interposed between the input light coupler and the output light coupler.

10. The high-resolution photonic thermometer article of claim 1, wherein the waveguide comprises a reflection photonic crystal.

11. The high-resolution photonic thermometer article of claim 1, further comprising a heat exchanger in thermal communication with the photonic thermometer.

12. The high-resolution photonic thermometer article of claim 11, further comprising a tube in which the photonic thermometer and heat exchanger are disposed.

13. The high-resolution photonic thermometer article of claim 12, further comprising an inert gas disposed in the tube, wherein the inert gas, the photonic thermometer, and the heat exchanger are hermetically sealed in the tube.

14. The high-resolution photonic thermometer article of claim 1, wherein the photonic crystal cavity comprises:
  a first modulated Bragg mirror comprising a first set of a plurality of photonic apertures; and
  a second modulated Bragg mirror in communication with the first modulated Bragg mirror and comprising a second set of a plurality of photonic apertures,
  wherein the photonic apertures in the first set:
    independently comprise a radius; and
    are arranged sequentially by a size of the radius of each photonic aperture such that a radial size of sequential photonic apertures decreases along a first taper direction that is directed away from the second modulated Bragg mirror;
  the photonic apertures in the second set:
    independently comprise a radius; and
    are arranged sequentially in a row by a size of the radius of each photonic aperture such that a radial size of sequential photonic apertures decreases along a second taper direction that is directed away from the first set; and the first set and the second set are adjacently disposed at a zero-length cavity that is an origin of the first taper direction and the second taper direction.

15. A process for making the high-resolution photonic thermometer article of claim 14, the process comprising:
   forming the waveguide on the substrate;
   determining a photonic band gap between a dielectric band edge function f1 and an air band edge function f2 for the photonic crystal cavity as a function of the size of the radius of the photonic apertures;
   selecting a resonance frequency $f_{res}$
   determining a maximum aperture radius $R_{max}$ such that f1($R_{max}$)=$F_{res}$
   selecting a minimum aperture radius $R_{min}$,
   selecting a number N of pairs of photonic apertures;
   determining a photonic mirror strength G as a function of radius $r_i$ of photonic apertures for selected resonance frequency $f_{res}$ so that $G_i$={G($r_i$), i=1, 2, . . . , N};
   forming the photonic crystal cavity on the substrate; and
   tapering the radii of the photonic apertures in the photonic crystal cavity from the maximum aperture radius $R_{max}$ to the minimum aperture radius $R_{min}$ based on the photonic mirror strength G to make the high-resolution photonic thermometer article.

16. A process for performing high-resolution photonic thermometry with the high-resolution photonic thermometer article of claim 1, the process comprising:
   receiving, by the light source, the control signal;
   producing, by the light source, the primary light;
   receiving, by the input light coupler of the photonic thermometer, the primary light;
   communicating the primary light to the photonic crystal cavity;
   receiving, by the photonic crystal cavity, the primary light from the waveguide;
   storing, by the photonic crystal cavity, the primary light when the primary light matches the resonance frequency of the photonic crystal cavity;
   receiving, by the output light coupler, the primary light as the thermometer light after the primary light has interacted with the photonic crystal cavity;
   communicating the thermometer light from the photonic thermometer;
   receiving, by the photodetector, the thermometer light from the photonic thermometer;
   producing, by the photodetector, the photodetector signal from the thermometer light;
   receiving, by the phase sensitive detector, the photodetector signal from the photodetector;
   receiving, by the phase sensitive detector, the reference frequency signal;
   producing, by the phase sensitive detector, the lock signal from the photodetector signal, based on the reference frequency signal;
   producing, by the local oscillator, the reference frequency signal; and
   receiving, by the servo controller, the lock signal from the phase sensitive detector and the reference frequency signal from the local oscillator;
   producing, by the servo controller, the control signal from the lock signal and the reference frequency signal; and
   controlling, with the by the control signal, the primary wavelength of the primary light produced by the light source to maximize the absorption power to perform high-resolution photonic thermometry.

17. The process for performing high-resolution photonic thermometry of claim 16, the process further comprising:
   producing, by a local oscillator, a reference frequency signal;
   receiving, by an electro-optic phase modulator, the primary light and the reference frequency signal;
   phase modulating, by the electro-optic phase modulator, the primary light based on the reference frequency signal;
   receiving, by a mixer, the photodetector signal and the reference frequency signal, wherein the phase sensitive detector comprises the mixer;
   producing, by the mixer, the lock signal.

18. The process for performing high-resolution photonic thermometry of claim 16, the process further comprising:
   receiving, by an optical circulator interposed between the light source and the photonic thermometer and between the photonic thermometer and the photodetector, the primary light from the light source;
   converting, by the photonic thermometer, the primary light to the thermometer light; and
   receiving, by the optical circulator, the thermometer light from the photonic thermometer.

19. The process for performing high-resolution photonic thermometry of claim 16, the process further comprising:
   determining a temperature of the photonic thermometer from the primary wavelength controlled by the control signal.

* * * * *